INVENTORS
LEE R. BAESSLER
HARVEY F. GLASSNER
BY Burns, Doane, Benedict, Swecker & Mathis
ATTORNEYS INVENTORS
LEE R. BAESSLER
HARVEY F. GLASSNER
BY Burns, Doane, Benedict, Swecker & Mathis
ATTORNEYS

FIG. 5 HEART RATE SWITCH

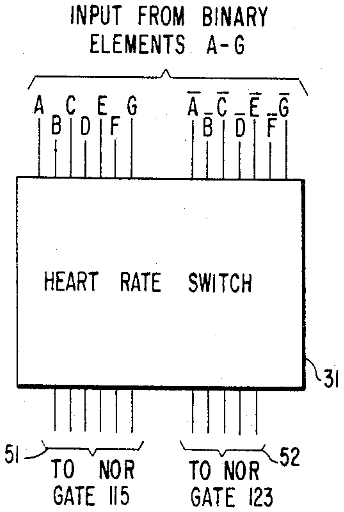

| SWITCH SETTING IN BEATS PER MINUTE | 60 | 75 | 90 | 105 | 120 |
|---|---|---|---|---|---|
| | RATE SWITCH PROGRAMMING | | | | |
| TO NOR GATE 115 | $\bar{G}$ | $\bar{G}$ | G | G | G |
| | F | F | $\bar{F}$ | $\bar{F}$ | $\bar{F}$ |
| | $\bar{E}$ | E | $\bar{E}$ | E | E |
| | D | D | D | $\bar{D}$ | $\bar{D}$ |
| | C | C | $\bar{C}$ | $\bar{C}$ | C |
| | B | B | B | $\bar{B}$ | B |
| TO NOR GATE 123 | $\bar{E}$ | $\bar{E}$ | $\bar{E}$ | E | E |
| | D | D | D | $\bar{D}$ | $\bar{D}$ |
| | $\bar{C}$ | C | C | $\bar{C}$ | $\bar{C}$ |
| | B | $\bar{B}$ | B | $\bar{B}$ | $\bar{B}$ |
| | $\bar{A}$ | $\bar{A}$ | $\bar{A}$ | $\bar{A}$ | $\bar{A}$ |

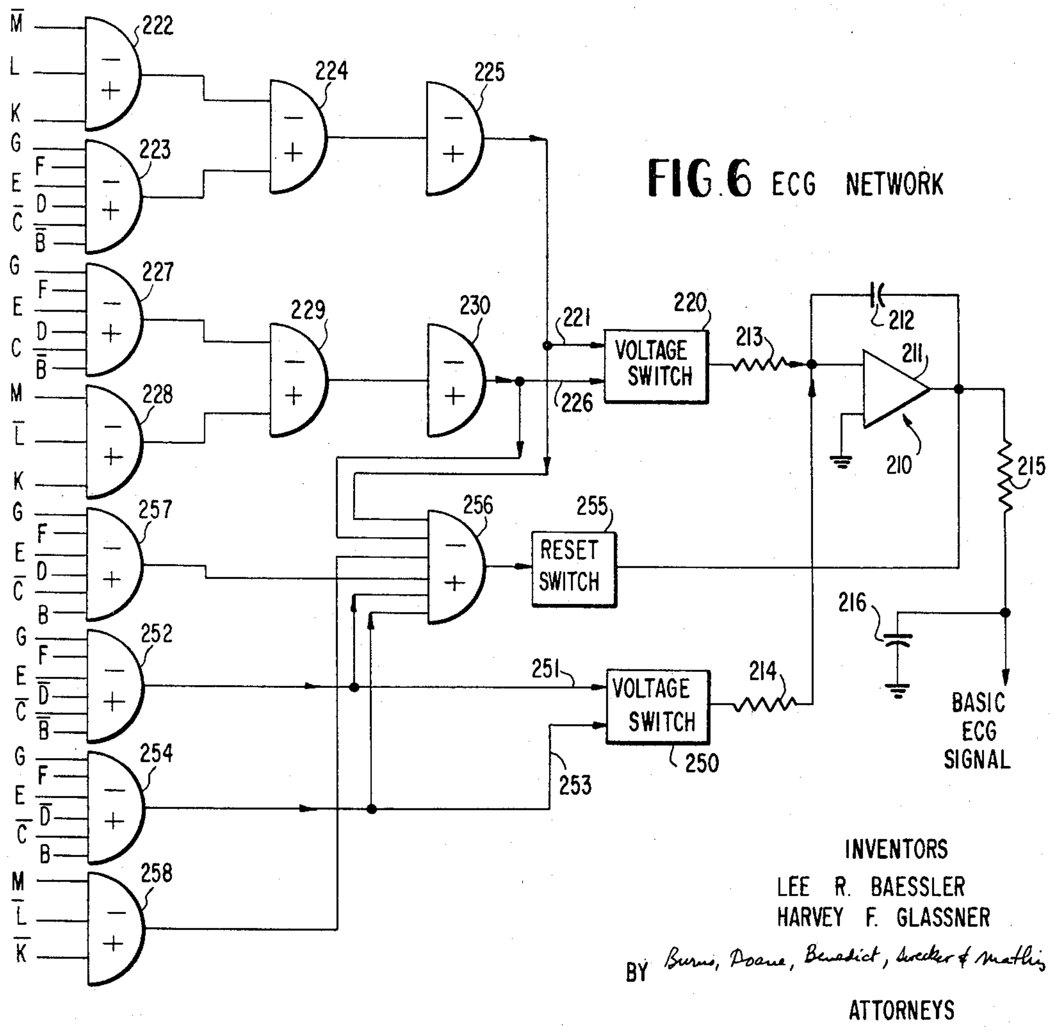

FIG. 6 ECG NETWORK

INVENTORS
LEE R. BAESSLER
HARVEY F. GLASSNER
BY Burns, Doane, Benedict, Swecker & Mathis
ATTORNEYS FIG. 7 VOLTAGE SWITCH
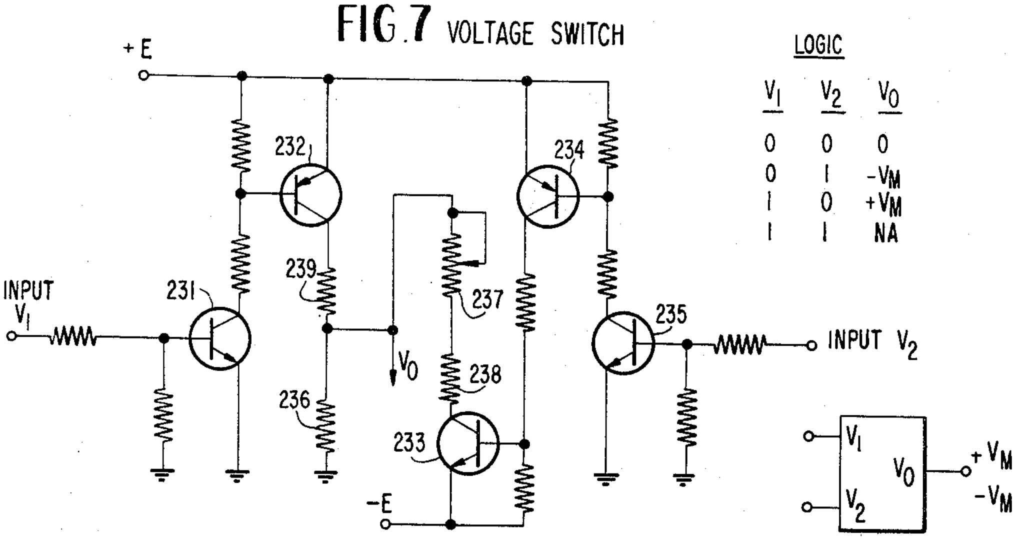
FIG. 8 RESET SWITCH, FIG. 9 OUTPUT VOLTAGE OF ECG INTEGRATOR
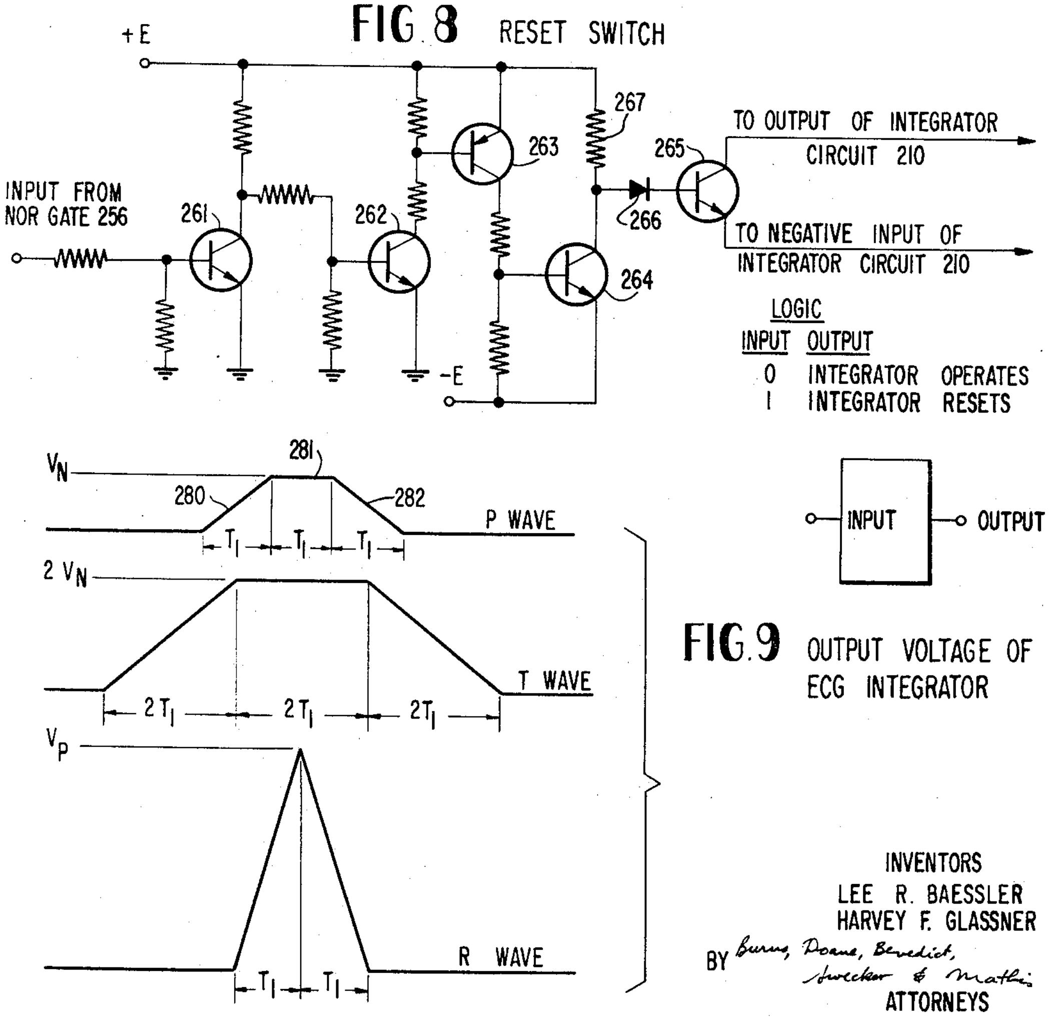
INVENTORS
LEE R. BAESSLER
HARVEY F. GLASSNER
BY Burns, Doane, Benedict, Swecker & Mathis
ATTORNEYS INVENTORS
LEE R. BAESSLER
HARVEY F. GLASSNER
BY
Burns, Doane, Benedict, Swecker & Mathis
ATTORNEYS

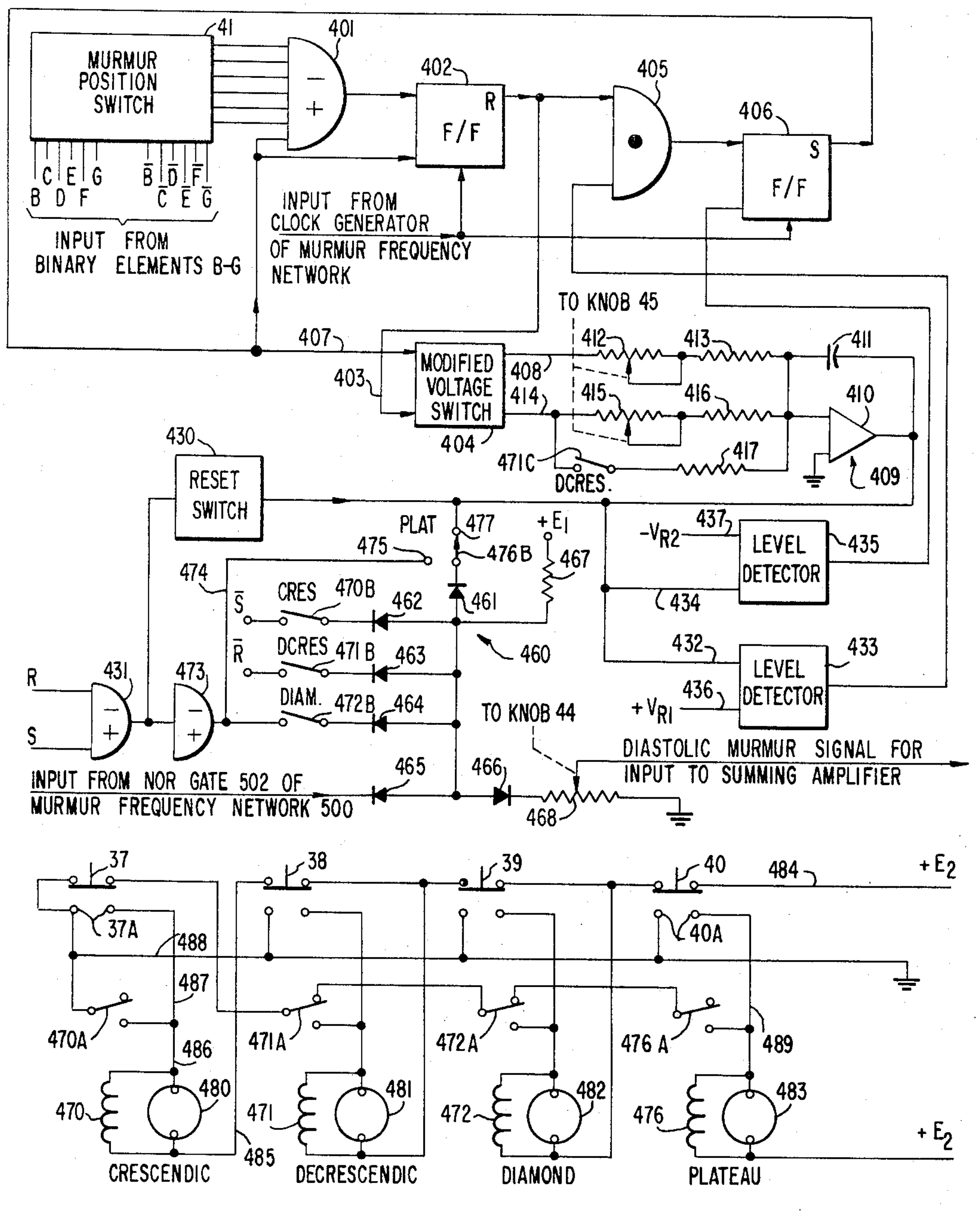
FIG. 11 DIASTOLIC MURMUR NETWORK
INVENTORS
LEE R. BAESSLER
HARVEY F. GLASSNER
BY Dunn, Doane, Benedict, Swecker & Mathis
ATTORNEYS SIMULATION OF HEART SIGNALS
FIG. 12 MODIFIED VOLTAGE SWITCH
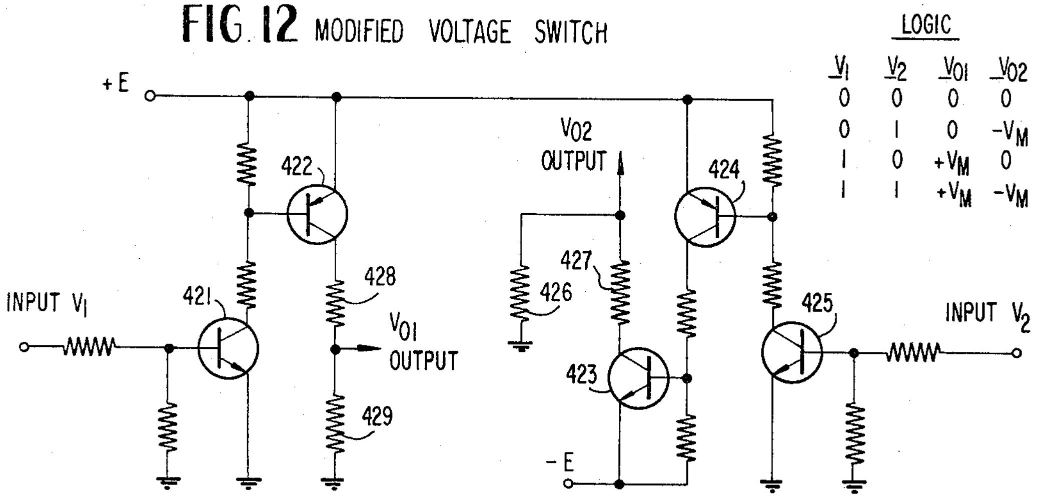
FIG. 13 LEVEL DETECTOR
LOGIC
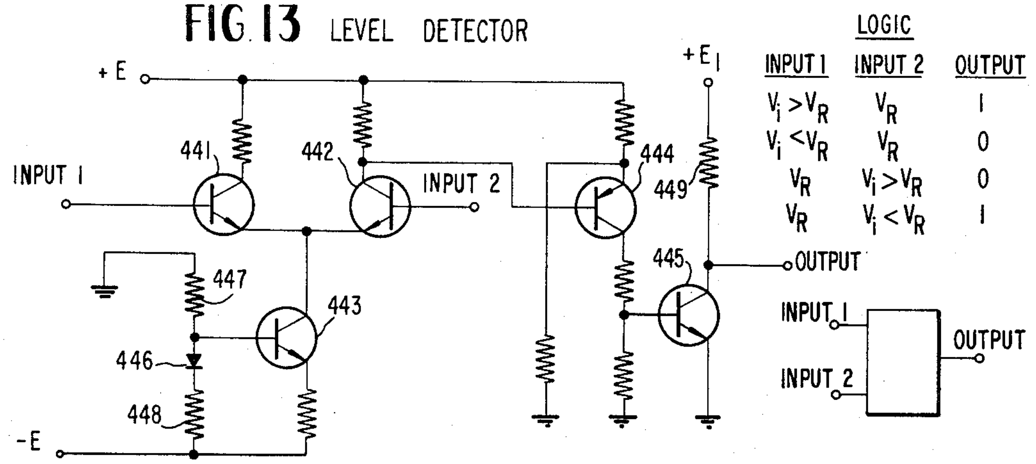
FIG. 14 MURMUR FREQUENCY NETWORK
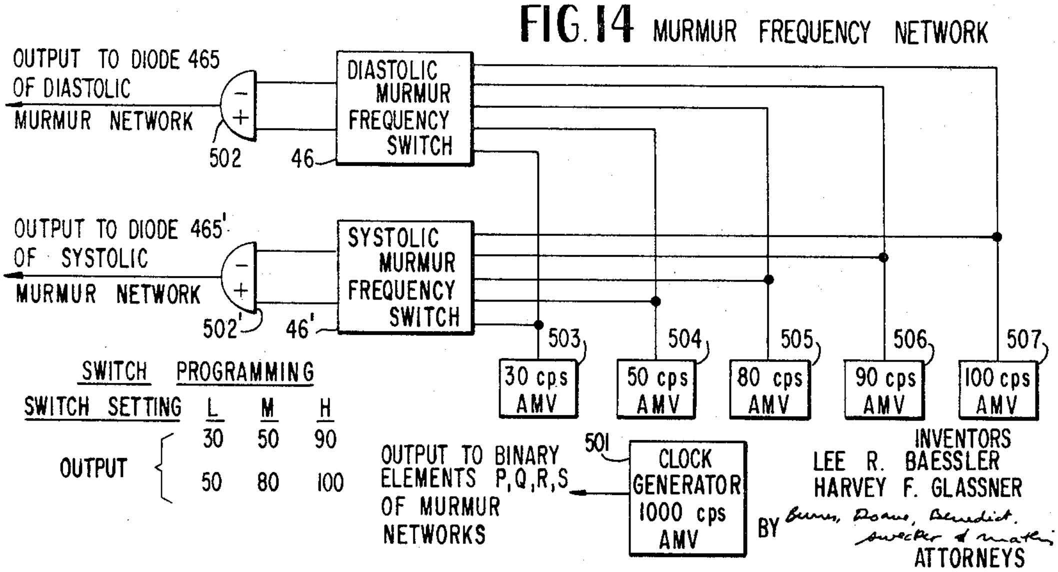
INVENTORS
LEE R. BAESSLER
HARVEY F. GLASSNER
BY Burns, Doane, Benedict, Swecker & Mathis
ATTORNEYS

SIMULATION OF HEART SIGNALS

Filed May 27, 1966

BINARY ELEMENT

INVENTORS
LEE R. BAESSLER
HARVEY F. GLASSNER

BY Burns, Doane, Benedict, Swecker & Mathis
ATTORNEYS

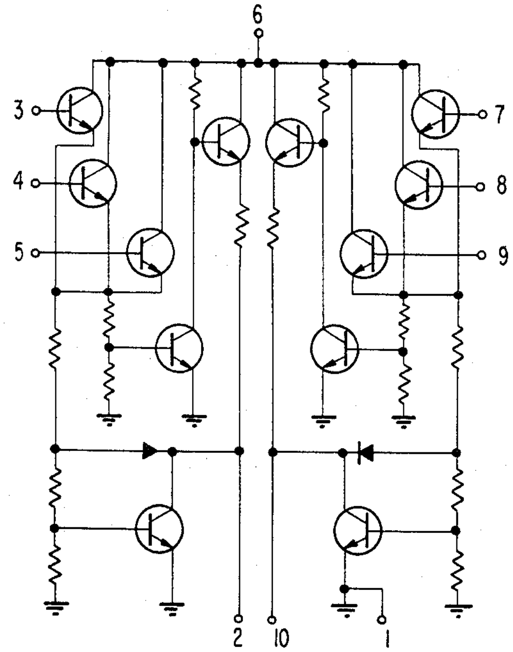
FIG.17 DUAL NOR GATE
FIG.18
7-INPUT NOR GATE
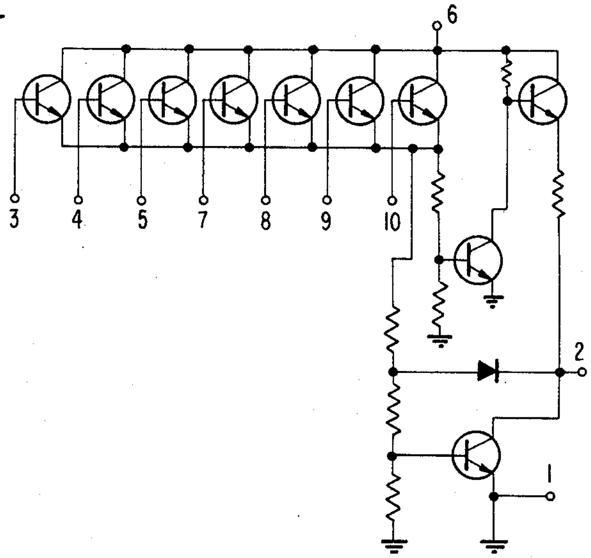
FIG.19
DUAL AND GATE
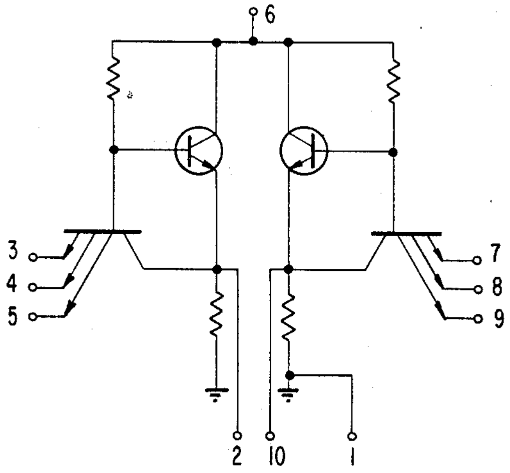
INVENTORS
LEE R. BAESSLER
HARVEY F. GLASSNER
BY Burns, Doane, Benedict, Swecker & Mathis
ATTORNEYS United States Patent Office 3,384,981

Patented May 28, 1968

3,384,981

SIMULATION OF HEART SIGNALS

Lee R. Baessler, Torrance, and Harvey F. Glassner, Los Angeles, Calif., assignor to Thiokol Chemical Corporation, Bristol, Pa., a corporation of Delaware Filed May 27, 1966, Ser. No. 553,511
30 Claims. (Cl. 35—17)

This invention relates to auscultation training aids and, more particularly, to a method and apparatus for the automatic simulation of normal heart signals, and particularly normal and abnormal heart sounds.

Auscultation, i.e., the act of listening to sounds arising within organs such as the heart, is a valuable tool of the medical profession in the diagnosis for treatment of disease and other abnormal conditions. The value of this tool to a particular physician, however, depends upon the accuracy with which the physician is able to identify the normal and abnormal sound patterns emanating from the organ. For example, the heart emits a recurring sound pattern which consists of a first sound, usually identified as $S_1$, and a second sound, usually identified as $S_2$. Each of these sounds may be described as being composed of a packet of low frequency incoherent oscillations. Although, for a given heart rate, the relative positions of these packets are substantially fixed in the cardiac cycle, an increase in heart rate will cause a corresponding decrease in the systolic interval, i.e., the period of time between the trailing edge of the $S_1$ heart sound and the leading edge of the $S_2$ heart sound. The time interval between the leading edge of the first heart sound $S_1$ and the leading edge of the second heart sound $S_2$ is usually identified as to the total systole, for it is during this period that the heart muscles contract and cause the arterial blood pressure to rise, with the highest blood pressure being reached immediately after systole of the left ventricle of the heart. The time interval between the leading edge of the second heart sound $S_2$ and the leading edge of the first heart sound $S_1$ of the next cardiac cycle is identified as the total diastole during which the heart expands and fills with blood. The second heart sound $S_2$ is composed of two parts: the first part being identified as $A_2$, and the second part being identified as $P_2$. The $A_2$ portion of the second heart sound, which is indicative of closure of the aortic valve, and the $P_2$ portion of the second heart sound, which is indicative of closure of the pulmonic valve, may be superimposed upon each other or may be separated in time in the cardiac cycles of various patients. The separation of the $A_2$ and $P_2$ portions of the second heart sound is usually referred to as a "split $S_2$" condition.

In addition to evaluating the information obtained from the relative amplitudes and positions of the first and second heart sounds in the cardiac cycle, the physician must be able to identify abnormal sounds, such as murmurs, which may occur at one or more places during the cardiac cycle. In general, a heart murmur is an abnormal sound which indicates a functional abnormality or the site of a structural abnormality of the heart, and may occur in a wide variety of forms. For example, a murmur may vary in intensity (according to Levine's scale, from 1 to 6), duration (from 20 milliseconds to over 300 milliseconds), frequency (from 50 cycles per second to over 300 cycles per second), and shape (crescendic, decrescendic, diamond, and plateau). When it is considered that these variations in murmur form must be identified and correlated with changes in the heart rate, variations in amplitude and position of the normal heart sounds, split $S_2$ conditions, and variations in position of a murmur within the cardiac cycle, it becomes apparent that the physician must auscultate an extremely large number of patients before he becomes familiar with the wide variety of normal and abnormal heart sound patterns which he may expect to encounter in practice. Usually, many years of practice are required in a cardiac clinic before a physician may be reasonably expected to have encountered such a wide variety of heart sound patterns. The usual stethoscopic examination of such a large number of patients having the required diversity of normal and abnormal heart sound patterns is not only extremely expensive, but is also time consuming. Additionally, it is desirable that the training in auscultation given to physicians and other professionals, such as nurses, must be correlated with basic electrocardiogram (ECG) training so that the student is provided with the basic relationship existing between the electrical and mechanical phenomena of the cardiac muscle. In many instances, however, it is not feasible to provide a basic ECG pattern for the student to refer to during auscultation training when large numbers of patients are being examined, such as in a cardiac clinic, for example, because of the time and expense involved in preparing the patients and setting up the necessary equipment.

Accordingly, it is an object of this invention to provide a method and apparatus for the automatic simulation of heart signal patterns, such as heart sound patterns and basic ECG patterns, for example.

It is a further object of this invention to provide a method and apparatus for the automatic simulation of normal and abnormal heart sounds which will enable a student to be trained in auscultation in the shortest possible time and at the least expense.

It is a still further object of this invention to provide a method and apparatus for the automatic simulation of heart sounds which are capable of accurately reproducing nearly every known normal and abnormal heart sound pattern.

It is another object of this invention to provide a method and apparatus for the automatic simulation of heart sounds which are capable of establishing a particular heart sound pattern and of accurately reproducing the identical pattern at a later time for the same or a different student.

It is an additional object of this invention to provide a method and apparatus for the automatic simulation of normal and abnormal heart sounds which are also capable of providing a simulated basic ECG pattern which is accurately correlated with the sound pattern being studied to provide the student with the basic relationship existing between the electrical and mechanical phenomena of the cardiac muscle.

It is another object of this invention to provide apparatus for the automatic simulation of normal and abnormal heart sounds which is of relatively small size and weight and which is extremely portable in nature to permit of the widest possible use.

It is an additional object of this invention to provide a method and apparatus for producing a simulated basic ECG signal having simulated P, R and T wave portions, wherein the basic ECG signal has a desired heart rate and the proper time phase relationship between the T wave portion and the P and R wave portions thereof for that heart rate.

Briefly, the present invention contemplates the cyclic generation of a first group of regularly sequentially occurring, uniquely digitally coded signals at a cyclic repetition rate equal to desired heart rates, so that said signals are digitally coded to represent the succeeding time intervals of the desired cardiac cycle. A second group of regularly sequentially occurring, uniquely digitally coded signals is cyclically generated in response to a particular digitally coded signal from the first group, so that the second group of coded signals has a cyclic repetition rate equal to the cyclic repetition rate of the first group of signals but has a cycle which starts at the beginning of the time interval of the desired cardiac cycle which is represented by the said particular digitally coded signal from the first group. The digitally coded signals from the first group of signals which represent the beginning of the time intervals of the desired cardiac cycle at which the $S_1$ heart sound and the P and R wave portions of the basic ECG pattern occur are respectively utilized to generate an audio frequency $S_1$ heart sound signal and analog signals corresponding to simulated P and R wave portions of an ECG pattern. Digitally coded signals from the second group of signals which represent the beginning of the time intervals of the desired cardiac cycle at which the $S_2$ heart sound and the T wave portion of the basic ECG pattern occur are similarly utilized to generate an audio frequency $S_2$ heart sound signal and an analog signal corresponding to a simulated T wave portion of the ECG pattern.

In order to simulate the decrease in systolic interval which results from an increase in heart rate, the cyclic generation of the second group of coded signals is made to begin at a point in time of the desired cardiac cycle which is dependent upon the heart rate selected. To this end, the particular digitally coded signal which "triggers" the generation of the second group of coded signals is so selected that the faster the heart rate the earlier in point of time of the cardiac cycle the cyclic generation of the second group of signals will begin. In the preferred embodiment of the invention, where binary ripple counters are utilized to generate the first and second groups of digitally coded signals, the selection of the foregoing particular digitally coded signal may be conveniently accomplished by a heart rate control switch which functions primarily to control the cyclic repetition rate of the first group of signals and hence the simulated heart rate. Since the $S_1$ heart sound signal and the P and R wave ECG signals are produced by digitally coded signals from the first group of signals and the $S_2$ heart sound signal and the T wave ECG signals are produced by digitally coded signals from the second group of signals, the position of the $S_2$ heart sound with respect to the $S_1$ heart sound in the simulated heart sound pattern and the position of the T wave with respect to the P and R waves in the simulated ECG pattern will be heart rate dependent and will reflect the decrease in systolic interval resulting from an increased heart rate.

The present invention also provides for the simulation of heart sound patterns having split $S_2$ conditions and one or more heart murmurs. The simulation of a split $S_2$ heart sound is accomplished by generating separate audio frequency signals corresponding to the $A_2$ and $P_2$ portions of the second heart sound in response to digitally coded signals from the second group of signals which represent the beginning of the time intervals of the desired heart sound pattern at which the $A_2$ and $P_2$ portions of the second heart sound occur. Signal selection means are provided to select the digitally coded signals which control the production of the $P_2$ portion of the second heart sound, so that the magnitude of the "split" between the $A_2$ and $P_2$ portions may be controlled.

Simulated heart murmurs are introduced into the heart sound pattern by generating audio frequency heart murmur signals corresponding to heart murmurs of various envelope shapes in response to digitally coded signals from the first group of signals. By controlling the selection of the digitally coded signals responsible for the production of a simulated heart murmur, the murmur may be located anywhere in the cardiac cycle and one or more simulated murmurs of the same or different shapes may be introduced into the desired heart sound pattern. The generation of the audio frequency murmur signals may be accomplished in the same manner as the generation of the audio frequency $S_1$ and $S_2$ heart sound signals, namely, by amplitude modulating a carrier signal with an analog signal corresponding to the envelope of the desired sound. In order to produce simulated murmurs having the four basic configurations, i.e., diamond, crescendic, decrescendic and plateau, the invention provides for the generation of a triangular modulating signal and a constant amplitude pulse modulating signal. The triangular modulating signal is used with a selectively gated modulator to generate the diamond, crescendic, and decrescendic-shaped murmurs, while the constant amplitude modulating signal is utilized to generate the plateau-shaped murmurs.

Means are provided for independently controlling the time position or phase, amplitude, duration, frequency spectrum and configuration of each simulated heart murmur produced, and for controlling the relative amplitudes of the $S_1$ heart sound and the $A_2$ and $P_2$ portions of the $S_2$ heart sound. The audio frequency $S_1$ and $S_2$ heart sound signals and the audio frequency heart murmur signals are sequentially combined in signal combining means, suitably filtered, and made available for use with either audio or visual presentation means. In the preferred embodiment of the invention, the basic ECG signal consists only of stylized P, R and T wave portions and is intended to provide the student with a basic pattern indicative of the electrical phenomena associated with the heart muscle. The basic ECG signal, however, does have the desired heart rate and the proper heart rate dependent time phase relationship between the T wave portion and the P and R wave portions. To this end, the stylized P, R and T wave signals are separately generated internally, combined in signal combining means, suitably filtered, and made available for presentation in conjunction with the simulated heart sound pattern signal.

In the drawings:

FIGURE 5 is a schematic diagram of the heart rate switch shown in FIGURE 3 and includes a table showing rate switch programming;

FIGURE 6 is a schematic circuit diagram of the ECG network which provides the basic ECG output signal for the automatic heart sound simulator of the invention;

FIGURE 7 is a circuit diagram of the voltage switch shown in FIGURE 6 of the drawings;

FIGURE 8 is a circuit diagram of the reset switch shown in FIGURE 6 of the drawings;

FIGURE 9 is a graphic showing of the generation of the simulated P, R and T waves of the basic ECG signal by the ECG network shown in FIGURE 6;

FIGURE 11 is a schematic circuit diagram of the diastolic murmur network shown in FIGURE 3 of the drawings which is used to generate a simulated heart murmur signal;

FIGURE 12 is a circuit diagram of the modified voltage switch shown in FIGURE 11 of the drawings;

FIGURE 13 is a circuit diagram of the level detector shown in FIGURE 11 of the drawings;

FIGURE 14 is a schematic diagram of the murmur frequency network shown in FIGURE 3 of the drawings;

Figure 15:
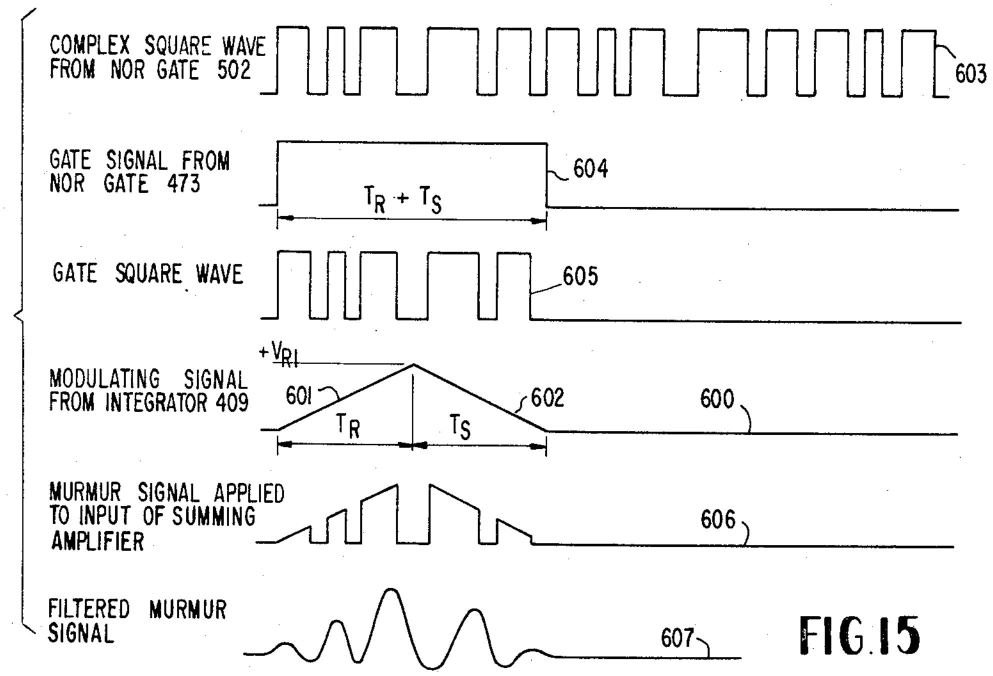

FIGURE 15 is a graphic showing of the waveforms utilized in the generation of a diamond-shaped heart murmur signal by the diastolic murmur network of FIGURE 11 and also illustrates generally the method employed to generate the audio frequency $S_1$ and $S_2$ heart sound signals; and FIGURES 16, 17, 18, and 19 are schematic circuit diagrams of certain commercially available logic circuits utilized in the heart sound simulator of the invention.

Figure 1:
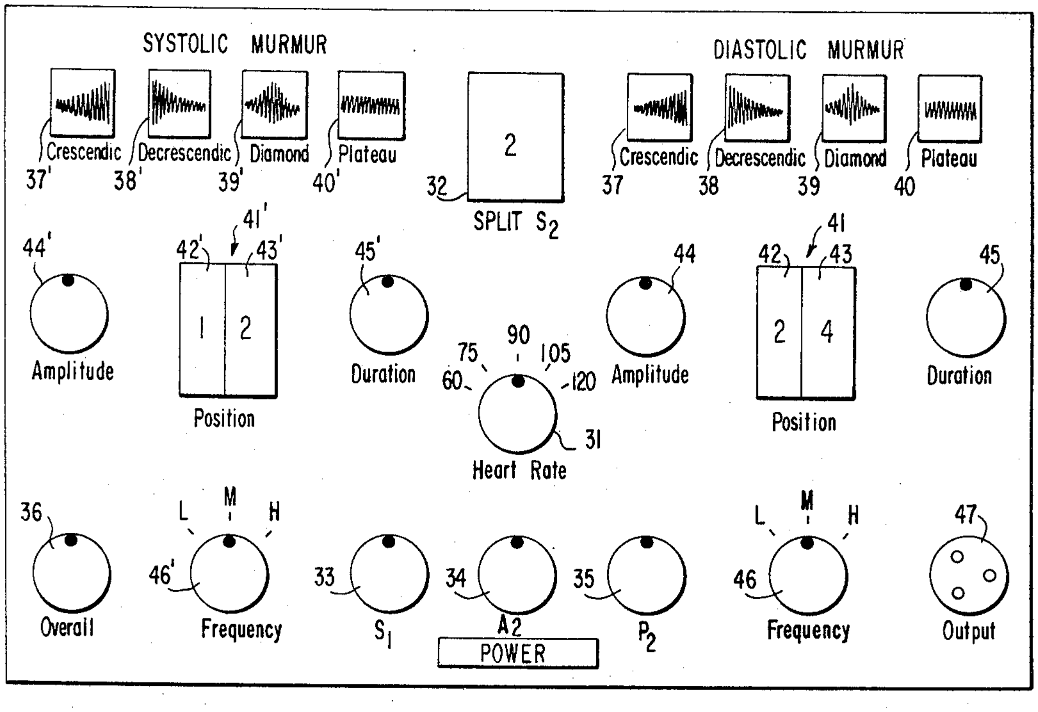
FIGURE 1 is a front elevational view of the control panel of a heart sound simulator constructed in accordance with the teachings of the present invention.

Referring now to FIGURE 1 of the drawings, there is shown the control panel of an automatic heart sound simulator constructed in accordance with the teachings of the present invention. As seen in FIGURE 1, the control panel includes a master "ON-OFF" power switch 30, which serves to control the power supply to the heart sound simulator. A heart rate switch 31 calibrated in beats per minute is provided to vary the heart rate in discrete steps from 60 b.p.m. to 120 b.p.m. Although the switch is illustrated as provided for heart rates of 60, 75, 90, 105, and 120 b.p.m., heart rates below, intermediate, or above these values can be adjusted for internally. In general, the heart rate switch 31 controls the repetition rate of the complete cardiac cycle and would establish the time interval between the leading edge of the first heart sound $S_1$ of a cardiac cycle and the leading edge of the first heart sound $S_1$ of the succeeding cardiac cycle. For each heart rate selected, the second heart sound $S_2$ is correctly placed in the cardiac cycle, with respect to the first heart sound $S_1$ to reflect the normal physiologic time interval for systole for that heart rate. A split $S_2$ switch 32 is provided to control the position in the cardiac cycle of the second part $P_2$ of the second heart sound with respect to the first part $A_2$ of that sound. The control provided here permits the leading edge of the envelope of $P_2$ to be controlled with respect to the leading edge of the envelope of $A_2$ in 25 millisecond intervals, such that $P_2$ may precede $A_2$ by 25 ms., may be superimposed upon $A_2$, or may lag $A_2$ in 25 ms. steps up to 150 ms. The foregoing values are merely representative, however, since the duration of each increment and the total range may be changed by suitably choosing the switch employed, as will be more apparent hereafter. The latter settings of this control may be used to produce the so-called "third" heart sound or an "opening snap." The intensities or amplitudes of the first and second heart sounds may be controlled independently by means of knobs 33, 34, and 35. Knob 33 serves to vary the amplitude of the $S_1$ sound from zero to an amplitude in excess of those observed clinically, while knobs 34 and 35, respectively, control part $A_2$ and Part $P_2$ of the $S_2$ heart sound. By virtue of this arrangement, each of the sounds $S_1$, $A_2$, and $P_2$ may be controlled independently to provide for the variations in relative amplitude observed in clinical auscultation. The over-all amplitude of the sounds in a complete heart sound pattern representing the complete cardiac cycle may be controlled by a knob 36 which acts as a volume or gain control for the output of the simulator.

The simulator also includes illuminated push button switches 37, 38, 39, and 40, which serve to control the shape or configuration of a first or "diastolic" murmur introduced into the simulated heart sound pattern. As illustrated, switch 37 provides a crescendic-shaped murmur, switch 38 provides a decrescendic-shaped murmur, switch 39 provides a diamond-shaped murmur, and switch 40 produces a plateau-shaped murmur. The position of the murmur in the cardiac cycle is controlled by a thumb switch 41 which comprises sections 42 and 43. Sections 42 and 43 may each be controlled independently from settings of zero to 7, to thereby provide a total range of settings from 00 to 77. The total usable range of this switch depends upon the heart rate selected, as will be explained more fully hereinafter. By adjustment of the murmur position switch 41, it is possible to "walk" any murmur through the entire cardiac cycle in chosen increments, such as 25 ms., for example. The setting of this switch determines the exact position of the leading edge of the murmur envelope in the simulated heart sound pattern with respect to the envelopes of sounds $S_1$ and $S_2$. The amplitude of the murmur produced by push buttons 37 through 40 may be controlled by a knob 44, such that the intensity of the murmur can be varied from no sound to a "grade 6" murmur, i.e., according to Levine's scale 1–6. The duration of the murmur produced by push buttons 37 through 40 may be controlled by a knob 45 in a manner to provide a relatively short pattern, such as 25 ms., for example, or one extending throughout the total systole or diastole. Finally, the basic frequency or pitch of the murmur introduced by the push buttons 37 through 40 may be controlled by a frequency switch 46. As illustrated, this switch is calibrated for low (30–60 c.p.s.), medium (75–100 c.p.s.), and high (80–150 c.p.s.) frequencies. The foregoing values given for murmur amplitude, duration and frequency are only representative, however, since any different ranges desired may easily be incorporated. The frequency referred to here relates to the frequency or pitch of the murmur itself, since a given murmur will be repeated only once during each cardiac cycle. It may also be noted that at each setting of the frequency switch 46, a range of frequencies is provided for. For example, at the low setting, the range would be 30–60 c.p.s. This arrangement provides for the close duplication of heart murmurs which are rarely, if ever, of a single frequency, but rather comprise a complex band of frequencies, which is simulated in the invention by a similar frequency spectrum.

The heart sound simulator of the invention also includes a set of controls for the introduction of a second murmur, which for convenience, has been labeled "systolic murmur," and which may be controlled independently of the first or "diastolic" murmur. As illustrated, the controls for the second murmur include murmur configuration push buttons 37′, 38′, 39′, and 40′, murmur position switch 41′, amplitude control knob 44′, duration control knob 45′, and murmur frequency switch 46′. These controls function in exactly the same manner as the controls for the first murmur and will not be further described. It may be pointed out, however, that the labels "systolic" and "diastolic" have been applied to the two sets of murmur controls, merely for convenience, since each of the two murmurs generated can be placed in any portion of the cardiac cycle. For example, the controls for the systolic murmur could be utilized to place a murmur in the total diastole period, while the diastolic murmur controls could be utilized to place a murmur in the total systole period. The heart sound pattern signal produced by the simulator appears at one terminal of a three-terminal output connector, designated as 47, and may be applied to presentation means, such as a loudspeaker, a stethophone, an oscilloscope, or a pen recorder to produce the desired heart sound pattern. If desired, several students wearing individual stethophones may receive the heart sound pattern signal from the simulator at the same time to provide for group training.

The heart sound simulator of the invention also produces an internally generated basic ECG signal consisting of stylized P, R, and T waves. This signal appears at a second terminal on the output connector 47 so that the student may correlate the heart sounds which he hears with the electrical phenomenon associated with the heart muscle. This internally generated ECG signal consists only of stylized P, R, and T waves, and does not present any indications of an abnormal heart condition, such as evidenced by a murmur, for example, so that the student is forced to rely solely upon his auditory senses to detect the abnormal condition. The repetition rates of the P, R, and T waves in the ECG signal are, however, correlated with the heart sound rate established by the heart rate switch 31 so that the student is able to correlate the sounds which he hears with the basic ECG pattern of P, R, and T waves. Additionally, the position of the T wave in the basic ECG pattern is made heart rate dependent to correctly portray the decrease in systolic interval which results from an increased heart rate.

Figure 2:
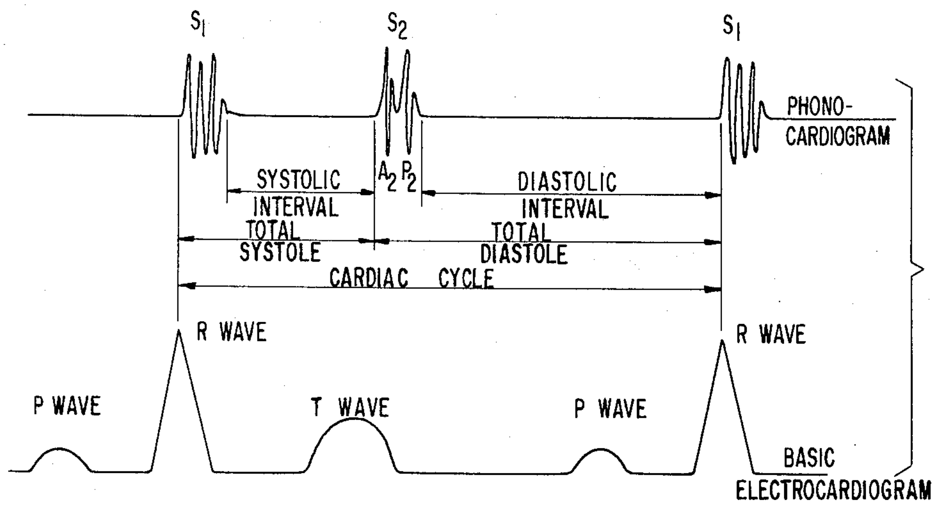
FIGURE 2 is a graphic showing of the simulated phonocardiogram and electrocardiogram output signals of the heart sound simulator of the present invention.

FIGURE 2 of the drawings illustrates the relationship between the heart sound pattern or "phonocardiogram"

signal and the basic ECG signal produced by the simulator when the two output signals are placed on a twin-beam oscilloscope or a twin-channel pen recorder. As seen in FIGURE 2, one complete cycle of the heart sound pattern signal consists of the $S_1$ and $S_2$ heart sounds. One or more heart murmurs (not shown) could be located anywhere in the cycle and would be repeated during each subsequent cycle. The basic ECG signal is shown in FIGURE 2 as a unipolar signal comprising highly stylized P, R, and T waves which are intended to merely symbolize the corresponding portions of a clinically recorded ECG pattern. The reverse polarity Q and S deflections of a clinically recorded ECG signal have been omitted from the basic ECG presentation of the invention since the P, R, and T wave portions are adequate to apprise the student of the time phase relationship between the heart sounds which he hears and the basic electrical activity of the heart.

Figures 3, 4:
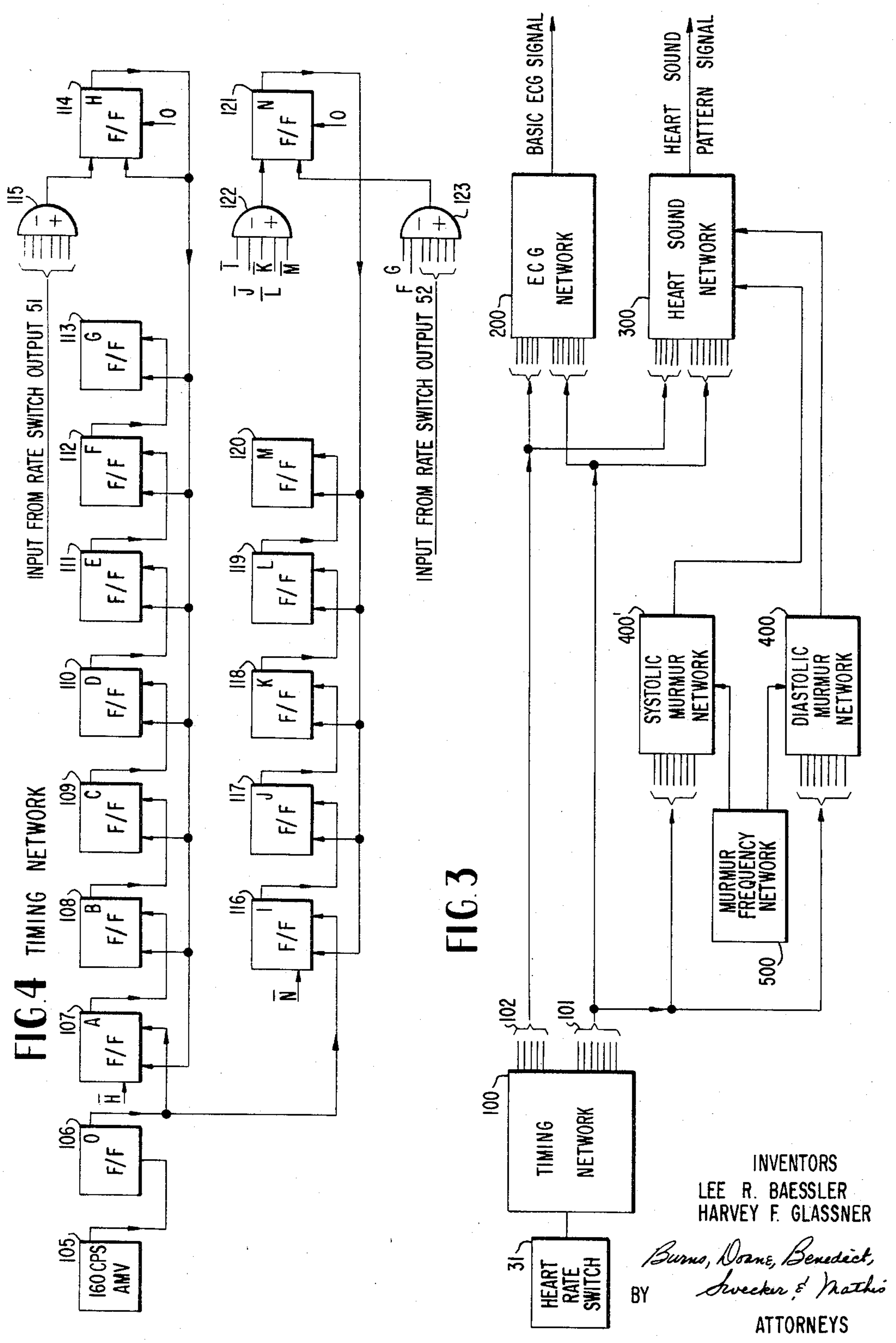
FIGURE 3 is a block diagram showing the over-all layout of the automatic heart sound simulator of the invention.
FIGURE 4 is a schematic circuit diagram of the timing network of the automatic heart sound simulator shown in FIGURE 3.

FIGURE 3 of the drawings illustrates in block diagram form the over-all layout of the heart sound simulator of the invention. As seen in FIGURE 3, the simulator comprises a timing network 100 which is controlled by the heart rate switch 31, an ECG network 200, a heart sound network 300, a diastolic murmur network 400, a systolic murmur network 400', and a murmur frequency network 500. The timing network 100 is a network which cyclically generates a plurality of sequentially occurring, uniquely digitally coded signals which are used to control the ECG netwokr 200, the heart sound network 300, the diastolic murmur network 400, and the systolic murmur network 400'. The cyclic repetition rate of the sequence of digitally coded signals produced by the timing network 100 is determined by the setting of the heart rate switch 31, so that the coded signals applied to the ECG, heart sound, and murmur networks cyclically recur at a "heart rate" determined by the setting of heart rate switch 31. The timing network 100 produces a first group of sequentially occurring, uniquely digitally coded signals 101 which are supplied to the ECG network 200 to produce the simulated P and R waves of the basic ECG signal. The same group is also applied to the heart sound network 300 to control the production of the first heart sound $S_1$. The first group of digitally coded signals 101 is also supplied to both the diastolic murmur network 400 and the systolic murmur network 400' to key the production of the murmur signals by these networks to the over-all heart rate as determined by the setting of heart rate switch 31. The timing network also produces a second group of sequentially occurring, uniquely digitally coded singals 102 which are applied to the ECG network 200 to control the production of the T wave of the basic ECG signal. The same signal group 102 is also applied to the heart sound network 300 to control the production of portions $A_2$ and $P_2$ of the second heart sound $S_2$. Since the heart sound network 300 and the ECG network 200 are both controlled by the outputs from the timing network 100, the first and second heart sounds $S_1$ and $S_2$ are directly keyed to the production of the P, R, and T waves of the basic ECG signal and both the basic ECG signal and the heart sound pattern signal cyclically recur at a repetition rate or "heart rate" determined by the setting of the heart rate switch 31. In a similar fashion, the murmur signals produced by murmur networks 400 and 400' are keyed to the heart rate and are directly related to the basic ECG signal and the heart sound pattern signal.

Figure 16:
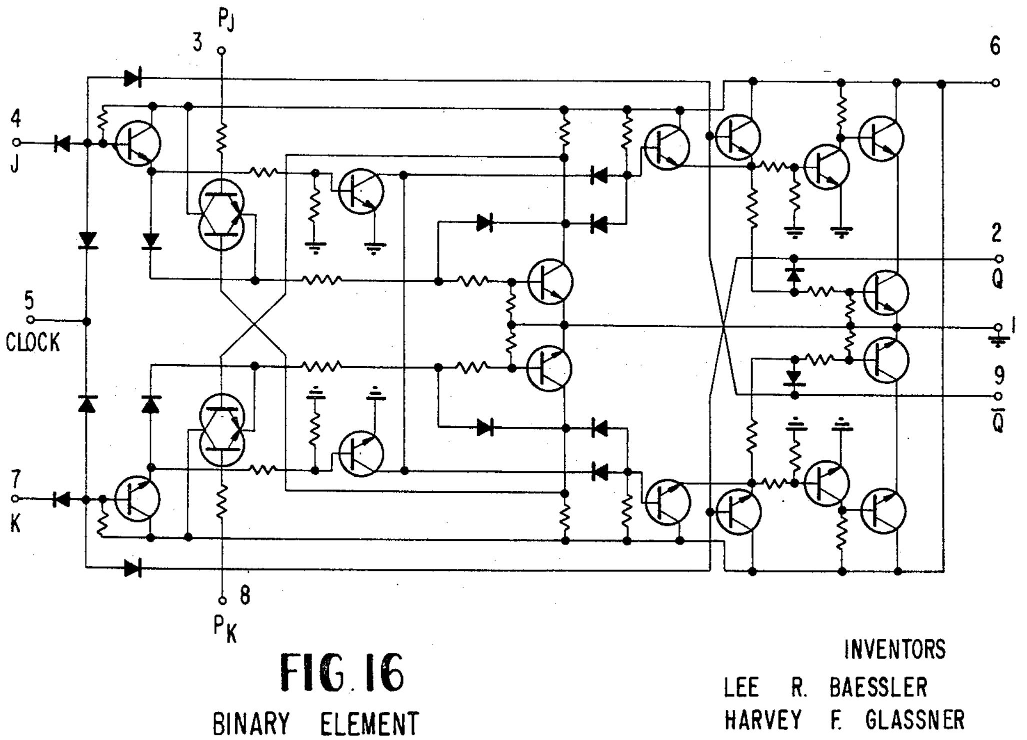

Referring now to FIGURE 4 of the drawings, the timing network 100 of FIGURE 3 is shown as comprising a conventional astable or "free running" multivibrator 105 which is preferably set to oscillate at a fixed frequency of 160 c.p.s. The 160 c.p.s. output from multivibrator 105 is supplied to the clock input of a binary element or "flip-flop" 106 which in turn produces an output labeled "O" comprising a square wave having a repetition rate of 80 c.p.s. Binary element 106 is essentially a bistable logic circuit having two stable states of operation which may be utilized to produce high and low outputs representing a binary 1 and a binary 0. When the flip-flop 106 is continuously triggered by the output of astable multivibrator 105, it is continuously switched from one stable state to the other, so that its resulting square wave output may be considered to be a continuous succession of binary 0's and binary 1's. Such a binary element provides two outputs, one of which is labeled the "true" output and the other of which is labeled the "false" output. In accordance with common practice, in describing the outputs of the various binary elements utilized in the heart sound simulator of the invention, the true output of a binary element such as a binary element X, for example, will be described as "X," while the output from the false side of binary element X will be described as "$\overline{X}$." In practice, binary element 106 may comprise any one of a number of commercially available units, such as type LU 320 of Signetics Semiconductor, Inc., for example, the circuit diagram of which is shown in FIGURE 16 of the drawings.

The square wave output of binary element 106 which will have a pulse repetition rate of one-half of the pulse repetition rate of the output from astable multivibrator 105 or, 80 c.p.s., is fed to a first binary ripple counter formed by binary elements 107, 108, 109, 110, 111, 112, and 113, which may conveniently comprise binary elements of the same type as binary element 106. These binary elements are connected in a conventional manner with the true output of one binary element being fed into the clock input of the next element, so that the pulse repetition rate of the output pulses of a particular binary element is exactly one-half the pulse repetition rate of the pulses fed to its clock input. Accordingly, when the 80 c.p.s. pulses from binary element 106 are supplied to binary element 107, the output from binary element 107 will be 40 c.p.s. and the output from binary element 108, 20 c.p.s., and so on down the chain to binary element 113 which will have an output of 5/8 c.p.s. Similarly, the duration of the pulses produced by each successive binary element from 106 to 113 will be increased by a factor of 2, so that the output pulse width of binary element 113 will be 128 times the pulse width from binary element 106. Binary elements 107 through 113 can be considered as cyclically generating a group of sequentially occurring, uniquely binary coded square wave signals consisting of 7 bit binary numbers, with the time required to go from binary number 0000000 to 1111111 to be approximately 1.6 seconds. During this 1.6 second-interval, every binary number from 0000000 to 1111111 will be produced at the outputs of binary elements 107 through 113. Accordingly, any 7 bit binary number from decimal 0 (binary 0000000) to decimal 127 (binary 1111111) will come on for 12.5 ms. and then go off and come on again every 1.6 seconds. For example, the binary number 1011001 which is the number 89 in the conventional decimal system will appear for 12.5 ms. and will be repeated every 1.6 seconds. The true binary logic output signals or bits from binary elements 107 through 113 have been labeled with the letters A through G, with the corresponding false outputs being designated $\overline{A}$ through $\overline{G}$. For simplicity of illustration, only the true output of each binary element will be shown.

If it is desired to shorten the period of time between successive appearances of a given 7 bit binary coded signal, it is possible to sense an intermediate binary number and utilize this output to set another binary element which, in turn, could be utilized to reset all of the binary elements of the ripple counter to zero. For example, if the binary number corresponding to the decimal number 63 were to be sensed, and this binary number were used to reset the binary elements of the ripple counter, the over-all period between successive appearances of the same 7 digit binary number would be 0.8 second, instead of 1.6 seconds. In other words, the binary ripple counter is only permitted to count up to a number lower than decimal 127 and is then reset to zero to begin the cyclic counting again, so that the time for a complete cycle up to the given number is shortened and depends upon the intermediate number selected. In the heart sound simulator of the invention, this function is performed by the heart rate switch 31, a binary element 114, and a NOR gate 115. As illustrated in FIGURE 5 of the drawings, the heart rate switch, which may conveniently comprise a standard 11 pole, 5 position wafer switch, has its input connected to the true and false outputs of each of binary elements A through G, and is so programmed that at each of its five positions, a particular 6 bit binary number will be produced at switch output 51 and a particular 5 bit binary number will be produced at switch output 52. For example, at a switch setting of 90 b.p.m., the 6 bit binary number appearing at switch output 51 will be $G\overline{F}\overline{E}D\overline{C}B$, and the particular 5 bit binary number appearing at output 52 will be $\overline{E}DCB\overline{A}$. The 6 bit coded signal appearing at switch output 51 is applied to the input of NOR gate 115 which may conveniently comprise a commercially available unit, such as type LU 314, manufactured by Signetics Semiconductor, Inc., for example, the circuit diagram of which is shown in FIGURE 18 of the drawings. In accordance with NOR logic, the output from NOR gate 115 will only become high, i.e., go from a binary 0 to a binary 1, when all six inputs are applied at the same time. The output of NOR gate 115 is applied to the set input of a binary element 114 (FIGURE 4) which has its clock input connected to the output of binary element O, as illustrated. The true output, designated H, of binary element 114 is applied to the reset input and to the reset inputs of binary elements A through G. The false output $\overline{H}$ of binary element 114 is applied to the reset input of binary element A, as illustrated. Since the output of binary element H is applied to the reset inputs of binary elements A through G, which permit these elements to be reset independently of the clock, binary elements A through G will be reset to a binary 0 condition whenever the output of binary element H goes from low to high, i.e., from binary 0 to binary 1. Additionally, since the output of binary element H is also fed to its reset input, which is in synchronism with the clock, it will itself be reset to binary 0 at the next succeeding clock pulse. By virtue of this arrangement, the ripple counter formed by binary elements A through G is permitted to count up to a particular binary number less than 1111111, as determined by the setting of the heart rate switch and is then reset to binary 0000000 when the particular binary number is sensed and applied to NOR gate 115, which causes binary element H to go from low to high.

Referring again to FIGURE 5 of the drawings, it will be noted that the heart rate switch 31 is calibrated in beats per minute (b.p.m.) and provides for heart rates of 60, 75, 90, 105, and 120 b.p.m. With the heart rate switch set at 60 b.p.m., for example, heart sounds $S_1$ and $S_2$ will each be repeated 60 times per minute and the accompanying P, R, and T waves of the ECG signal will each be repeated 60 times per minute. Furthermore, the sequence of binary coded signals produced by binary elements A through G, which are used to control the production of the first heart sound $S_1$ and P and R waves of the basic ECG signal, are also repeated at a rate of 60 times per minute. Similarly, as the rate switch is advanced to higher settings, such as 75, 90, 105 and 120 b.p.m., for example, the binary ripple counter formed by binary elements A through G is permitted to count only up to successively lower numbers, so that the group of binary coded output signals from these elements, which is used to produce the first heart sound $S_1$ and the P and R waves of the basic ECG signal, has increasing cyclic repetition rates of 75, 90, 105 and 120 times per minute. By virtue of this arrangement, a group of sequentially occurring, uniquely binary coded signals is produced at cyclic repetition rates of 60, 75, 90, 105, and 120 times per minute, depending upon the setting of rate switch 31. The cyclic repetition rate of this group of signals is made equal to the desired heart rate, so that the sequentially occurring coded signals within the group define a complete cardiac cycle for the heart rate selected. Since the signals forming the group are uniquely binary coded and occur in sequence, each signal represents or defines the beginning of a particular time interval within the simulated cardiac cycle, and can be used to control the production of a heart sound or basic ECG signal component which occurs during that time interval. Accordingly, it follows that the accuracy with which a simulated heart sound signal or basic ECG signal component may be placed within a given cardiac cycle depends upon the number of binary coded signals which define the cardiac cycle. If a large number of binary coded signals are generated, each signal will define the beginning of a correspondingly small time interval during the complete cycle and a fine degree of control may be exercised. It is therefore believed to be apparent that the number of binary elements forming the binary ripple counter may be increased or decreased to provide the degree of accuracy and control desired.

In a similar fashion, the timing network 100 of FIGURE 3 also produces a second group of sequentially occurring, uniquely binary-coded signals which are employed to generate the T wave portion of the basic ECG signal and the $A_2$ and $P_2$ portions of the second heart sound $S_2$. To this end, the timing network, as shown in FIGURE 4, includes binary elements 116, 117, 118, 119, and 120 which may take the same form as binary elements 106 through 114. The binary elements 116 through 120 are connected to form a second binary ripple counter, the output from binary element O being connected to the clock input of binary element 116 to key the operation of the second binary ripple counter to the operation of the first binary ripple counter. Accordingly, the 80 c.p.s. square wave output from binary element O causes binary element 116 to produce an output of 40 c.p.s. and the remaining binary elements 117 through 120 to produce outputs successively lower in frequency by a factor of 2. The outputs of binary elements 116 through 120, which have been labeled I through M, can produce binary numbers ranging from 00000 to 11111, or in conventional decimanl numbers, from 0 to 31. The operation of this second ripple counter is controlled by a binary element 121 and by NOR gates 122 and 123 which may conveniently take the same form as the corresponding elements of the first binary ripple counter. As illustrated, binary element 121, which has been labeled N for convenience, has its clock input connected to receive the 80 c.p.s. output from binary element O, its true output N connected to the reset inputs of binary elements I through M and its false output $\overline{N}$ connected to the reset input of binary element I which is in synchronism with the clock. The set input of binary element N is connected to the output of NOR gate 122 which, in turn, receives its input from the false sides of binary elements I, J, K, L, and M. The reset input of binary element N, which is in synchronism with the clock, is connected to the output of NOR gate 123 which, in turn, receives its input from binary elements G and F, and from the output 52 of the heart rate switch.

It may be noted that binary elements I through M will be reset to binary 00000 whenever they have counted to binary 11111 because of the combined action of binary element N and NOR gate 122 which is connected to receive the false outputs of binary elements I through M. Binary elements I through M will also be reset to binary 00000 whenever a particular 7 bit binary coded signal is produced at the output of the first ripple counter formed by binary elements A through G. This action is produced by binary element N and NOR gate 123 which is controlled by a 7 bit binary coded signal derived from the outputs of binary elements F and G and the output 52 of the heart rate switch. This particular 7 bit binary coded signal represents the beginning of a particular time interval of the cardiac cycle defined by the binary coded signals from the output of the first ripple counter and is determined by the setting of the heart rate switch. By virtue of this arrangement, the second ripple counter formed by binary elements I through M will be started counting whenever the particular 7 bit coded signal is applied to the input of NOR gate 123 and will be reset to binary 00000 in readiness for the start of a new cycle whenever it has counted to binary 11111. Accordingly, the group of sequentially occurring, uniquely binary coded signals produced by the second binary ripple counter will have a cyclic repetition rate equal to the cyclic repetition rate of the first group of sequentially occurring, uniquely binary coded signals produced by the first ripple counter, but will start its cycle at the beginning of the time interval of the cardiac cycle which is represented by the particular 7 bit signal applied to NOR gate 123. This arrangement is intended to permit the simulation of the shortened systolic interval which results from an increased heart rate. In other words, as the heart rate is increased, the time interval between the trailing edge of the first heart sound $S_1$ and the leading edge of the second heart sound $S_2$ will be correspondingly decreased. Since the second group of binary coded signals, which is produced by the second ripple counter, is utilized to control the production of the $A_2$ and $P_2$ portions of the second heart sound and the simulated T wave portion of the basic ECG signal, the foregoing arrangement permits the location of the $S_2$ heart sound and the T wave portion of the basic ECG signal in the cardiac cycle to be made heart rate dependent. Additionally, since the 7 bit signal which is applied to the input of NOR gate 123 represents the point in the cycle of the first binary ripple counter at which the second ripple counter begins to count, the foregoing objective may be accomplished by suitably coding the heart rate switch, as shown in the table labeled "Rate Switch Programming" in FIGURE 5 of the drawings. As seen in the table of FIGURE 5, switch output 52 which is applied to NOR gate 123 consists of the outputs from binary elements A through E, which constitute the most significant bits of the aforementioned 7 bit signal. The 5 bits of switch output 52 are changed by each setting of the heart rate switch 31 in a manner such that the faster the heart rate, the earlier in point of time of the cycle of the first ripple counter the cycle of the second binary ripple counter will begin, to thereby reflect the decrease in systolic interval resulting from an increased heart rate.

The ECG network 200 which generates the basic ECG signal produced by the heart sound simulator of the invention is shown in FIGURE 6 of the drawings as comprising an integrator circuit 210 which is formed by an operational amplifier 211, a capacitor 212, and input resistors 213 and 214. The operational amplifier 211 may conveniently comprise a high gain D.C. differential amplifier of the type widely used in the analog computer field. Capacitor 212 is coupled between the output and the input of amplifier 211 in a well-known manner to provide negative feedback, so that the voltage output of the amplifier will be the integral with respect to time of the voltage applied to the amplifier input. The output of integrator circuit 210 is supplied to a low pass filter formed by resistor 215 and capacitor 216. The input of the integrator circuit is connected to the output of a first voltage switch 220 through input resistor 213 and is also connected to the output of a second voltage switch 250 through input resistor 214. Voltage switch 220, which will be described in detail hereinafter, has a first input 221 which is controlled by NOR gates 222, 223, 224, and 225 and a second input 226 which is controlled by NOR gates 227, 228, 229, and 230. In a similar fashion, the second voltage switch 250 has a first input 251 which is controlled by NOR gate 252, and a second input 253 which is controlled by NOR gate 254. A reset switch 255 is provided to reset the integrator circuit 210 to zero, as will be more fully described hereinafter. As illustrated, the output of reset switch 255 is coupled to the integrator circuit 210 and the single input of the switch is controlled by a NOR gate 256 which receives its inputs from NOR gates 257 and 258, and also from the NOR gates 222, 223, 224, 225, 227, 228, 229, and 230, which control the first voltage switch 220 and NOR gates 252 and 254 which control the second voltage switch 250. In practice, NOR gates 222, 224, 225, 228, 229, 230, and 258 may conveniently comprise any one of the commercially available NOR gates having the required number of inputs, such as one-half of a type LU 315 dual NOR gate, manufactured by Signetics Semiconductor, Inc., the circuit diagram of which is shown in FIGURE 17 of the drawings, while NOR gates 223, 227, 252, 254, 256, and 257 may similarly comprise a commercially available NOR gate, such as the type LU 314 NOR gate, manufactured by the same company. With respect to NOR gates 224 and 225 and NOR gates 229 and 230, which are serially connected, it may be pointed out that the second gates, i.e., gates 225 and 230, merely serve the function of phase reversal and could, if desired, be replaced by other circuits performing a similar function The circuit diagram of the first voltage switch 220 and the second voltage switch 250 is shown in FIGURE 7 of the drawings, wherein it is seen that the voltage switch comprises transistors 231, 232, 233, 234, and 235. A first input voltage $V_1$ is applied to transistor 231 which is connected to a common emitter configuration. The output of transistor 231 is coupled to the base input of transistor 232 which is connected in a common emitter configuration. A second input voltage $V_2$ is applied to transistor 235 which is connected in the common emitter configuration and the output of transistor 235 is coupled to the base input of transistor 234 which is connected in the common emitter configuration. The output of transistor 234 is applied to transistor 233 which is also connected in the common emitter configuration. The output voltage $V_0$ of the circuit appears at the junction of resistors 236 and 239 which form a voltage divider in the collector circuit of transistor 232. Since resistor 236 is also common with the collector circuit of transistor 233 and forms a voltage divider with resistors 237 and 238 in the collector circuit of that transistor, the output voltage $V_0$ is taken from a point common to both circuits.

In general, the voltage switch is a device which receives logic signals at its two inputs and produces a discrete analog voltage at its output which is dependent upon the relationship of the applied logic signals. In operation if $V_1$ and $V_2$ are both low signals, i.e., a binary 0, the output voltage $V_0$ will be zero, because transistors 231 through 235 will all be cut off. If input voltage $V_2$ is a high signal, i.e., a binary 1, and input signal $V_1$ is a binary 0, the output voltage $V_0$ will be $-V_M$, the magnitude of which is dependent upon the voltage divider made up of resistors 236, 237, and 238. The low signal at the first input causes transistors 231 and 232 to be cut off and the high signal at the second input causes transistors 235, 234, and 233 to be in saturated condition. For all practical purposes, the saturation voltage of transistor 233 can be neglected and the output voltage $-V_M$ is the output of the voltage divider made up of resistors 236, 237, and 238, between the negative supply voltage $-E$ and ground. When input voltage $V_1$ comprises a high signal and input voltage $V_2$ comprises a low signal, transistors 231 and 232 are saturated and transistors 233, 234, and 235 are cut off. Neglecting the saturation voltage of transistor 232, the output voltage $V_0$ is a voltage $+V_M$, the magnitude of which is determined by the voltage divider made up of resistors 239 and 236. In practice, resistors 236, 237, 238, and 239 are generally selected such that the output voltage $V_0$ will be either $+V_M$, zero, or $-V_M$, depending upon the logic signals applied. As is apparent from the logic table in FIGURE 7 of the drawings, high logic signals are never applied to the two inputs to the switch at the same time.

The circuit diagram of reset switch 255 is shown in FIGURE 8 of the drawings, wherein it is seen that the switch comprises transistors 261, 262, 263, 264, and 265. Transistors 261, 262, and 263 are arranged in conventional base input configuration to control transistor 264 which has its collector-emitter circuit connected in series with a resistor 267 between a positive source of D.C. supply voltage +E and a negative source of D.C. supply voltage −E. The collector of transistor 264 is connected to the base of transistor 265 through a diode 266. The collector of transistor 265 is connected to the output of integrator circuit 210 and the emitter of transistor 265 is connected to the negative input of integrator circuit 210, so that the resistance presented by the collector-emitter circuit of transistor 265 is connected in parallel circuit with the integrating capacitor 212 of integrator circuit 210. In operation, the reset switch 255 functions as a device which presents a variable output resistance in response to applied input logic signals. To this end, it may be noted that the base of transistor 265 is connected through diode 266 to the output of a voltage divider circuit formed by resistor 267 and the collector-emitter circuit of transistor 264. Accordingly, if a low logic signal is applied to the input of the reset switch, transistor 261 is cut off and transistors 262, 263, and 264 are saturated. Since transistor 264 is saturated, its collector-emitter circuit presents a very low resistance so that the output of the voltage divider circuit, which appears at the collector of transistor 264, closely approaches the supply potential −E. Since the emitter of transistor 265 is very close to ground potential, no current will flow into the base of transistor 265 through diode 266 because the anode potential of the diode is lower than the cathode potential. Accordingly, since no base current is flowing in transistor 265, its collector-emitter circuit presents a high resistance across the integrating capacitor 212 so that the integrator circuit 210 operates in a normal manner. If a high logic signal is applied to the input of the reset switch, transistor 261 saturates and transistors 262, 263, and 264 are cut off. Since transistor 264 is now cut off, it presents a high resistance in the voltage divider circuit which it forms with resistor 267 with the result that the anode potential of diode 266 goes toward +E volts and current begins to flow through diode 266 into the base of transistor 265. With base current flowing in transistor 265, the apparent resistance presented by its collector-emitter circuit becomes low, thereby effectively short circuiting the integrating capacitor 212 and resetting the output of the integrator circuit 210 to zero.

In describing the operating of the ECG network shown in FIGURE 6 of the drawings, it may be noted that the various NOR gates, which control voltage switches 220 and 250 and reset switch 255, receive their inputs from the binary coded output signals of the timing network 100. Binary coded output signals from binary elements B through G, which form the first ripple counter, are applied to NOR gate 223 which is arranged to control input 221 of voltage switch 220 through NOR gates 224 and 225. Binary coded signals from the same group of binary elements are also applied to NOR gate 227 which is arranged to control the other input 226 of voltage switch 220 through NOR gates 229 and 230. The binary coded signals applied to NOR gates 223 and 227 are arranged to generate the simulated P wave of the basic ECG signal. Similarly, NOR gate 222 and NOR gate 228, which receive binary coded signals from the output of binary elements M, L, and K of the second binary ripple counter, are coupled to the two inputs of voltage switch 220 and are so arranged as to generate the simulated T wave of the basic ECG signal. Binary coded output signals from binary elements B through G of the first ripple counter are also applied to NOR gates 252 and 254 which are respectively connected to the two inputs to the second voltage switch 250 in an arrangement which results in the production of the simulated R wave of the basic ECG signal. It may be pointed out that NOR gate 256, which controls the operation of reset switch 255, is arranged to receive inputs from NOR gates 257 and 258, which are respectively responsive to the outputs of the first and second binary ripple counters, and also the inputs from NOR gates 225, 230, 252, and 254, which are responsive to the binary coded signals which produce the simulated P, R, and T waves of the basic ECG signal. By virtue of this arrangement, integrator circuit 210 is digitally controlled to provide an analog voltage, comprising the wave shapes of the simulated P, R, and T waves of the basic ECG signal.

The detailed operation of ECG network 200 may best be understood by reference to FIGURE 9 of the drawings wherein the output voltage of the integrator circuit 210 is depicted for the generation of the simulated P, R, and T waves of the basic ECG signal. Assuming initially that the integrator circuit 210 is in a reset condition, i.e., its output voltage is zero, when the binary coded signal $GFEDC\overline{B}$, which produces portion 280 of the P wave of the basic ECG signal, is reached by the first binary ripple counter formed by binary elements A through G during its cyclic counting operation, the output of NOR gate 227 will go high for a period of time $T_1$ which is determined by the binary coded pulses applied to gate 227. The high output from NOR gate 227 is applied to input 226 of voltage switch 220 through NOR gates 229 and 230. Since input 226 of the voltage switch is high and input 221 of the voltage switch is low, the voltage switch 220 produces a negative output voltage $-V_M$ for a period of time $T_1$. This negative voltage $-V_M$ is applied to the input of integrator circuit 210 through resistor 213 and causes the output of the integrator circuit to rise linearly from zero volts to a maximum voltage of $V_N$ during the time interval $T_1$. During the next period of time $T_1$, no logic signals are applied to voltage switch 220 and the output of voltage switch 220, accordingly, is zero volts. During this period of time, the output of integrator circuit 210 will stay constant at $V_N$ volts and will product the portion 281 of the P wave shown in FIGURE 9 of the drawings. As the first binary ripple counter continues to count, it will then reach the binary coded signal $GFED\overline{CB}$ which is applied to the input of NOR gate 223 and will cause NOR gate 223 to become high for a period of time $T_1$. Since the high output of NOR gate 223 is coupled to input 221 of voltage switch 220, and since the other input 226 of the voltage switch is now low, the voltage switch output will go from zero to $+V_M$ volts for a period of time $T_1$. This positive voltage $V_M$, when applied to the input of integrator circuit 210, causes the output voltage of the integrator to decrease linearly from $V_N$ volts to zero volts during the time interval $T_1$. This action produces the portion 282 of the P wave shown in FIGURE 9 of the drawings. At this time, the binary coded signals applied to the NOR gates which control the reset switch 255 become high and cause the reset switch to operate to reset the output voltage of integrator circuit 210 to zero. The NOR gates which control the reset switch keep the output of integrator 210 at zero volts at any time that logic signals are not being applied to the inputs of voltage switches 220 and 250. Since the binary coded input signals applied to NOR gates 223 and 227 are being cyclically repeated by the first binary ripple counter formed by binary elements A through G at a rate determined by the setting of the heart rate switch 31, the P wave will be generated once during each complete cardiac cycle. The stylized P wave produced by the integrator 210 is passed through the low pass filter formed by resistor 215 and capacitor 216 to provide a smooth waveform for application to the presentation means.

The T wave portion of the basic ECG signal is generated in substantially the same manner as the P wave, utilizing NOR gates 222 and 228. NOR gate 228, which is connected to receive the binary coded input $\overline{M}LK$, will become high when that binary coded signal is reached by the second ripple counter formed by binary elements I through M, and will remain high for a period of time determined by the pulse make-up of the binary coded input signal to the NOR gate 228. In practice, this period of time may conveniently be approximately twice as long as the period of time $T_1$ utilized for production of the segments of the P wave. The high output of NOR gate 228 will cause input 226 of the first voltage switch 220 to become high and the voltage switch will apply the negative voltage $-V_M$ to the integrator circuit 210 for a period of time $2T_1$. As seen in FIGURE 9 of the drawings, since the $-V_M$ output from voltage switch 220 is applied to the integrator circuit for twice the length of time that the corresponding P wave voltage is applied, the resulting amplitude of the T wave will be $2V_N$ volts or twice as great as the amplitude of the P wave. During the next period of time $2T_1$, no logic signals are applied to voltage switch 220 and the output of the integrator circuit will remain constant at $2V_N$ volts. When the second binary ripple counter reaches the coded signal $\overline{M}LK$ applied to NOR gate 222, it will cause NOR gate 222 to become high and will subsequently cause voltage switch 220 to produce a positive voltage VM for a period of time $2T_1$ during which the output voltage from the integrator circuit will decrease linearly from $2V_N$ volts to zero volts. It will be noted that since the inputs to NOR gates 222 and 228 are derived from the second binary ripple counter formed by binary elements I through M, which is heart rate dependent, i.e., the second ripple counter will begin to count at some point in the cardiac cycle determined by the setting of the heart rate switch 31, the position of the T wave in the cardiac cycle with respect to the P and R waves will be dependent upon the particular heart rate selected, and will therefore correctly simulate the normal systolic interval at the different heart rates.

The R wave portion of the ECG signal is generated by the combined action of NOR gates 252 and 254 and voltage switch 250 in controlling the integrator circuit 210. When the binary coded signal $GFE\overline{D}CB$ is reached by the first binary ripple counter during the course of its cyclic counting operation, NOR gate 254 will become high for a period of time $T_1$ and will cause the output voltage from integrator circuit 210 to rise from zero volts to a voltage of $V_P$. Although the output voltage from voltage switch 250 will still be $-V_M$ during this time interval $T_1$, the output voltage actually applied to the input of integrator 210 will be substantially higher because resistor 214 is selected to have a value of approximately one-quarter of the value of resistor 213 so that the resulting amplitude of the stylized R wave produced by the output of the integrator will be much larger than either the P wave or the T wave. When the output of NOR gate 254 becomes low at the end of time interval $T_1$, the first binary ripple counter will reach the binary coded signal $GFE\overline{DC}B$ and the output of NOR gate 252 will become high, thereby causing voltage switch 250 to apply a voltage of $+V_M$ to the integrator for another period of time $T_1$, during which the output voltage of the integrator will decrease linearly from $V_P$ volts to zero volts. At this time, the reset switch 255 will again operate to reset the integrator output to zero. From the foregoing description, it is believed apparent that the internally generated basic ECG signal will consist of highly stylized P, R, and T waves which are recurrently generated at the heart rate selected by heart rate switch 31. The P, R, and T waves are generated in that order during each cardiac cycle with the P and R waves being generated in response to the coded signals from the first group of signals produced by the first binary ripple counter. Since the T wave is generated in response to coded signals produced by the heart rate dependent second ripple counter, the T wave will be positioned correctly with respect to the P and R waves in each cardiac cycle for the particular heart rate selected. It may be noted that no provision is made in the ECG network for the generation of signals representing abnormal heart sounds, such as murmurs. Since the heart sound simulator of the invention is intended to train the student in the art of auscultation, abnormal heart conditions are only presented in the audio output of the simulator, so that the student is forced to rely solely upon his auditory senses in detecting the abnormal heart condition. The basic ECG signal supplied by the simulator is intended merely to permit the student to correlate the mechanical workings of the heart with the basic electrical phenomena represented by the basic ECG signal.

Figure 10:
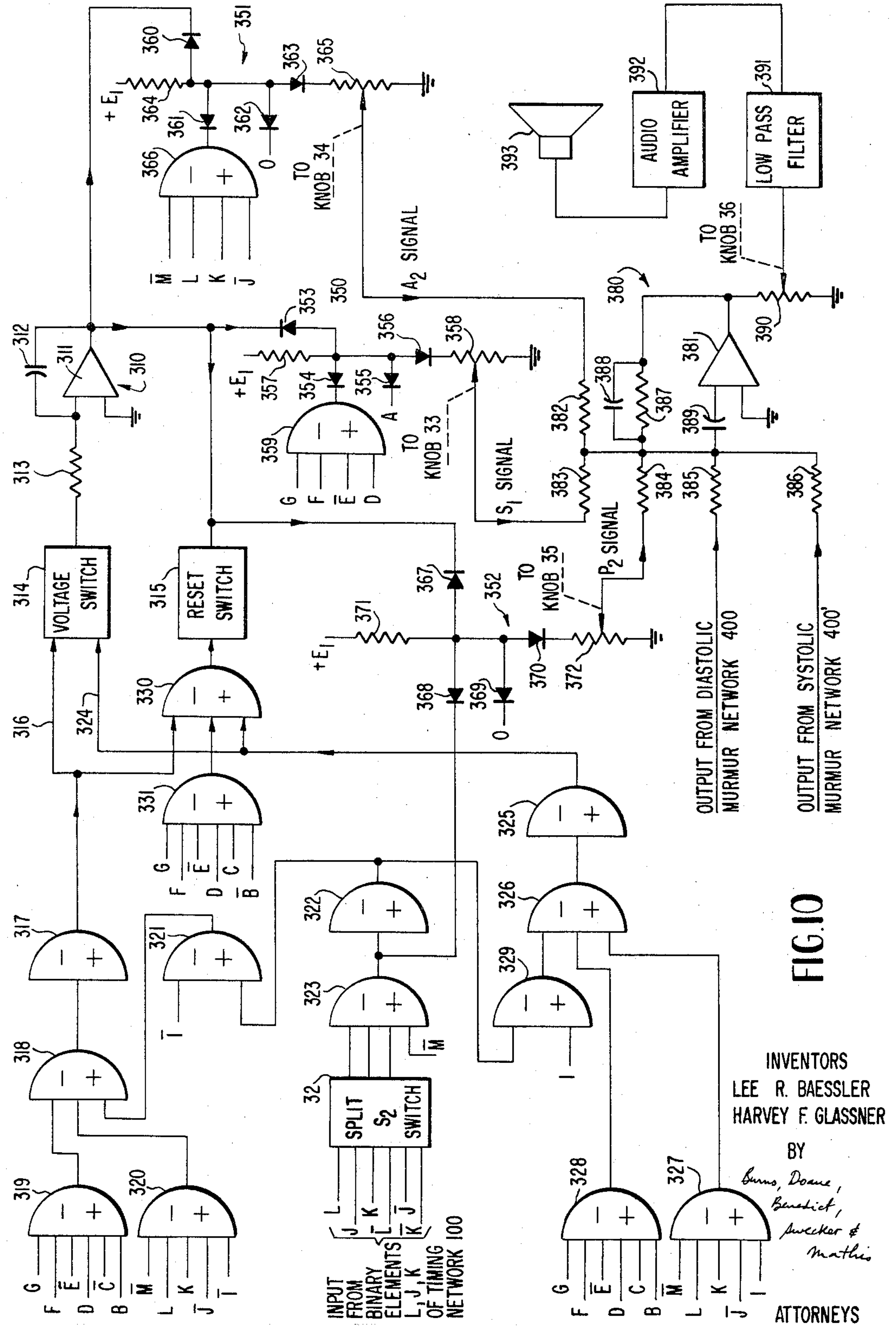
FIGURE 10 is a schematic circuit diagram of the heart sound network for the heart sound simulator shown in FIGURE 3 of the drawings.

Referring now to FIGURE 10 of the drawings, the heart sound network 300 is shown as including an integrator circuit 310 formed by an operational amplifier 311, a feedback capacitor 312, and an input resistor 313. The integrator circuit 310 is controlled by a voltage switch 314 and is reset by a reset switch 315 in the same manner as the equivalent elements of the ECG network 200. Voltage switch 314 has a first input 316 which is controlled by NOR gates 317, 318, 319, 320, 321, 322, and 323. A second input 324 of voltage switch 314 is controlled by NOR gates 325, 326, 327, 328, 329, 322, and 323, it being noted that NOR gates 322 and 323 provide an output which is applied to both inputs of the voltage switch 314. The single input to reset switch 315 is controlled by NOR gates 330 and 331 with gate 330 also receiving the outputs from the NOR gates controlling the voltage switch 314. In practice, NOR gates 317, 318, 321, 322, 325, 326, 329, and 330 may comprise a commercially available NOR gate, such as one-half of the aforementioned type LU 315 dual NOR gate, manufactured by Signetics Semiconductor, Inc., while NOR gates 319, 320, 323, 327, 328, and 331 may similarly comprise the aforementioned type LU 314 NOR gate of the same manufacture.

Integrator circuit 310, voltage switch 314, reset switch 315, and the various NOR gates used to control these elements, function in substantially the same manner as the equivalent components of the ECG network to produce heart sound envelope modulating signals for the first heart sound $S_1$ and the two parts $A_2$ and $P_2$ of the second heart sound $S_2$. To this end, it may be noted that NOR gates 319 and 328 receive binary coded input signals from elements B through G of the first binary ripple counter in timing network 100 and utilize these signals to produce the envelope voltage for the first heart sound $S_1$. Similarly, NOR gates 320 and 327 receive binary coded input signals from binary elements I through M of the second binary ripple counter in the timing network and utilize these signals to produce the $A_2$ portion of the second heart sound. It will be noted, however, that NOR gate 323 receives its input from the false side of binary element M of the second ripple counter and also receives a 3 bit input from split $S_2$ switch 32. Split $S_2$ switch 32 has its input connected to receive the true and false outputs from binary elements J, K and L of the second ripple counter of timing network 100, and is arranged to provide at its output a series of binary coded 3 bit numbers. In practice, split $S_2$ switch 32 may conveniently comprise a single octal coded switch having settings ranging from 0 to 7 in increments of one. Since one octal (numbered to the base 8) digit is equal to three binary digits, each of the eight possible settings of switch 32 will produce a different 3 bit binary coded output signal consisting of various combinations of the true and false outputs of binary elements J, K and L. The 3 bit output from split $S_2$ switch 32 is applied to the input of NOR gate 323 where the false output $\overline{M}$ of binary element M is added. The output from NOR gate 323 which now represents 4 bits is applied to the inputs of NOR gates 321 and 329 through inverting NOR gate 322. In NOR gate 321, a fifth bit, consisting of the false output $\bar{I}$ of binary element I is added and the resultant output representing combinations of the outputs of binary elements I, J, K, L and M is applied to input 316 of the voltage switch 314. The 4 bit output from NOR gate 323, which is applied to the input of NOR gate 329 through NOR gate 322, has a fifth bit added consisting of the true output I of binary element I of the second ripple counter. The 5 bit coded output from NOR gate 329 consisting of the outputs of binary elements I, J, K, L and M is applied through NOR gates 326 and 325 to input 324 of the voltage switch 314. These 5 bit logic signals applied to voltage switch 314 are utilized to generate the second portion $P_2$ of the second heart sound $S_2$ and by adjusting the setting of split $S_2$ switch, it is possible to adjust the position of the leading edge of the second portion $P_2$ of the second heart sound with respect to the leading edge of the first portion $A_2$ in increments of approximately 25 milliseconds. For example, the binary coded output from split $S_2$ switch 32 may be such that with the switch in its position number 0, the leading edge of the $P_2$ portion of the second heart sound leads the leading edge of the $A_2$ portion by the aforementioned 25 millisecond interval. Further, in position number 1 of split $S_2$ switch 32, $P_2$ and $A_2$ may be superimposed and in each higher position of the switch, the leading edge of $P_2$ will lag the leading edge of $A_2$ by increasing increments of 25 milliseconds. Although the output from split $S_2$ switch 32 consists only of a 3 bit coded signal comprising the outputs of binary elements J, K and L, these 3 bits are the significant bits for purposes of control and the I and M bits which are added in the various NOR gates are added to form a 5 bit coded signal which is used to control the voltage switch 314. These 5 bit binary coded signals consist of combinations of the outputs of binary elements I through M, as do the 5 bit coded signals applied to the NOR gates 320 and 327, which control the generation of the first portion $A_2$ of the second heart sound. Accordingly, the $A_2$ and $P_2$ portions of the $S_2$ heart sound will both be of the same duration, since this is determined by the pulse make-up of the 5 bit coded signals and may conveniently be set at 25 milliseconds. The binary coded signals applied to NOR gates 319 and 328 produce the first heart sound $S_1$ and are seen to comprise the outputs of binary elements B through G of the first ripple counter. The combined pulse widths of these coded signals will substantially exceed the combined pulse widths of the coded signals for the $A_2$ and $P_2$ portions of the second heart sound and may conveniently be established at 75 milliseconds.

The output of integrator circuit 310, which comprises the voltage envelopes of the first heart sound $S_1$, the first portion $A_2$ of the second heart sound, and the second portion $P_2$ of the second heart sound, is applied to a first diode modulator circuit 350, a second diode modulator circuit 351, and a third diode modulator circuit 352, which respectively produce the $S_1$ sound signal, the $A_2$ sound signal, and the $P_2$ sound signal. Diode modulator 350 is seen to comprise diodes 353, 354, 355 and 356, a voltage dropping resistor 357 connected to a D.C. supply voltage source $+E_1$, and an output potentiometer 358 which is mechanically connected to the amplitude control knob 33 for the first heart sound $S_1$ on the simulator control panel. A NOR gate 359, which may conveniently comprise the same commercially available type as NOR gates 319, 320, 327, and 328, has its output connected to diode 354 and its input arranged to receive a 4 bit binary coded signal derived from the outputs of binary elements D, E, F and G of the first binary ripple counter in the timing network 100. Diode 355 is connected to receive the 40 c.p.s. square wave output of binary element A of the first ripple counter in the timing network 100 which functions as the carrier signal to be modulated. NOR gate 359 and diode 354 function as a clamping circuit which provides a gated output for the modulator circuit. It will be noted that the 4 bit input $GF\bar{E}D$, applied to NOR gate 359, is the same as the 4 most significant bits applied to NOR gates 319 and 328, which produce the $S_1$ sound modulating signal at the output of integrator 310, so that the output of NOR gate 359 will be high during the production of the $S_1$ modulating signal. At all other times, the output of gate 359 will be low, and the cathode of diode 354 will be at a lower potential than its anode so that the carrier signals A to be modulated, which are supplied to diode 355, flow through diode 354 and do not reach the output of the modulator circuit. During the period of generation of the $S_1$ sound, the output of NOR gate 359 is high and the cathode potential of diode 354 becomes greater than its anode potential, with the result that the carrier signals A to be modulated are modulated by the $S_1$ voltage envelope modulating signal from the integrator circuit 310 and the modulated signal, which now comprises the unfiltered $S_1$ sound, is passed through potentiometer 358 to the output of the modulator circuit. The foregoing arrangement prevents the passage of unmodulated carrier signals at the output of the diode modulator. Adjustment of potentiometer 358 by knob 33 on the simulator control panel accordingly provides a convenient means for controlling the amplitude of the $S_1$ heart sound. It may be pointed out that although a 40 c.p.s. square wave from binary element A is supplied as the carrier signal to be modulated, the frequency content of the $S_1$ sound will actually contain other frequencies because of the various side bands produced by the modulating process.

Diode modulator circuit 351 is seen to comprise diodes 360, 361, 362, and 363, a voltage dropping resistor 364 connected to a source of D.C. supply voltage $+E_1$, and an output potentiometer 365. Diode 361 is connected to receive the output of a NOR gate 366 which receives a 4 bit input consisting of the significant bits used to control the production of the $A_2$ portion of the second sound in NOR gates 320 and 327. Diode 362 is connected to receive the 80 c.p.s. square wave output of binary element O of the timing network and serves to introduce the carrier signal to be modulated. Output potentiometer 365 is mechanically connected to knob 34 on the control panel of the simulator which is used to adjust the amplitude of the $A_2$ portion of the second heart sound. Diode modulator 351 functions in precisely the same manner as diode modulator 350. When the output from NOR gate 366 is high, the 80 c.p.s. square wave from binary element O is modulated by the modulating signal from the output of integrator circuit 310 to provide the first portion $A_2$ of the second heart sound. At all other times, the output from NOR gate 366 is low thereby preventing any output signal from appearing at the output of the modulator circuit. It may be noted that the carrier signal to be modulated here is 80 c.p.s., which will result in the production of a second heart sound having complex frequencies in the range of 80 to 100 c.p.s., which closely approximates the true $S_2$ sound.

Diode modulator 352, which produces the second portion $P_2$ of the second heart sound, is seen to comprise diodes 367, 368, 369, and 370, a voltage dropping resistor 371 connected to a D.C. supply voltage source $+E_1$, and an output potentiometer 372 which is mechanically connected to knob 35 on the simulator control panel to provide for adjustment of the amplitude of the $P_2$ portion of the second heart sound. The carrier signal to be modulated, which is applied to diode 369, is also obtained from binary element O of the timing network, since the second portion $P_2$ of the second heart sound has the same frequency content as the first portion $A_2$. Clamping circuit control for the diode modulator 352 is provided by the output of NOR gate 323, which is applied directly to diode 368. Since NOR gate 323 is supplied with the 4 most significant bits used to control the production of the $P_2$ sound, the modulator will be gated to operate only during the production of the $P_2$ portion of the second heart sound and will not produce any output signals at any other time.

The $S_1$, $A_2$, and $P_2$ heart sound signals produced by diode modulators 350, 351, and 352 are applied to a summing amplifier 380 comprising amplifier 381, summing resistors 382, 383, 384, 385, and 386, feedback resistor 387, and capacitors 388 and 389. In practice, the summing amplifier 380 may comprise any of the known types of summing amplifiers utilized in the analog computer art. The heart sound signal from the output of the summing amplifier 380 is applied through a potentiometer 390, a low pass filter 391, and an audio amplifier 392 to presentation means, such as the loudspeaker 393 illustrated. Potentiometer 390 is mechanically linked to knob 36 on the front panel of the simulator and provides an over-all gain adjustment for the heart sound pattern signals applied to loudspeaker 393, without disturbing the relative amplitudes of the component parts of the signal. The low pass filter 391 serves to attenuate the unwanted higher harmonics of the square waves that were modulated by the heart sound envelope signals. It may be noted that the summing amplifier 380 combines, not only the normal heart sound signals $S_1$, $A_2$, and $P_2$, but also the diastolic murmur and systolic murmur signals which are respectively applied to summing resistors 385 and 386, as will be more fully explained hereinafter.

The over-all operation of the heart sound network 300 is quite similar to the ECG network 200 with the exception that the analog output signal from integrator circuit 310 is employed as a modulating signal to produce the various normal heart sounds. When binary elements B through G of the first binary ripple counter reach the binary coded signals applied to NOR gates 319 and 328 during the course of their cyclic counting operation, the voltage envelope for the first heart sound $S_1$ will be produced by the integrator circuit 310 and employed to modulate the output of binary element A in diode modulator 350. During this time, modulators 351 and 352 are prevented from operating by the clamping circuits controlled by NOR gates 366 and 323. Diode modulator 350 will supply the modulated $S_1$ sound signal to summing resistor 383, however, because the output of NOR gate 359 is high. After the $S_1$ signal has been generated, reset switch 350 is actuated by the various NOR gates and resets the integrator circuit 310 to zero. At the same time, the clamping circuits applied to diode modulators 350, 351, and 352 prevent these circuits from supplying any output to the summing amplifier. When the second binary ripple counter formed by elements I through M reaches the coded signals applied to NOR gates 320 and 327, the envelope of the $A_2$ portion of the second heart sound will be generated by the integrator circuit 310 and applied to diode modulators 350, 351, and 352. NOR gate 366 will now go high and permit the output from binary element O to be modulated to produce the $A_2$ portion of the second heart sound, which is applied to summing resistor 382. Again, since the output of NOR gates 323 and 359 is low, modulators 350 and 352 will not operate to supply any signals to the summing amplifier. Finally, binary elements I through M of the second ripple counter will reach the 5 bit coded signal determined by the setting of the split $S_2$ switch 32, and NOR gate 323 will cause the integrator circuit 310 to produce the envelope of the $P_2$ portion of the second heart sound. At this time, diode modulator 352 will be gated by the output of NOR gate 323 to permit the modulating signal to modulate the output of binary element O to generate the portion $P_2$ of the second heart sound, which is then applied to summing resistor 384. Again, the outputs of NOR gates 359 and 366 will be low so that no output signal is produced by modulators 350 and 351. Since the control for the $S_1$ heart sound signal is derived from binary elements B through G, the $S_1$ sound will be repeated at a rate determined by the setting of heart rate switch 31. The $A_2$ and $P_2$ portions of the second heart sound will be repeated at the same rate as the $S_1$ sound since the second ripple counter formed by binary elements I through M has the same cyclic repetition rate as the first binary ripple counter. However, the time delay or phase shift between the second heart sound $S_2$ and the first heart sound $S_1$ during each complete cardiac cycle will be dependent upon the heart rate selected by heart rate switch 31 since the second binary ripple counter does not begin to count until the first binary ripple counter reaches a point in its cycle which is determined by the setting of the heart rate switch. Finally, the split $S_2$ switch 32 may be utilized to control the position of the second portion $P_2$ of the second heart sound with respect to the first portion $A_2$ of that sound.

The basic process involved in the production of the simulated $S_1$ and $S_2$ heart sounds may be understood by reference to the waveforms shown in FIGURE 15 of the drawings. Although the waveforms shown in this figure of the drawings are primarily intended to depict the production of the heart murmur signals by the murmur networks 400 and 400', they may also be used as an aid to understanding the operation of the heart sound network 300. As seen in FIGURE 15, the carrier signal to be modulated, which is applied to the diode modulating circuits, consists of a square wave 603 which is obtained either from binary element O or binary element A, depending upon the modulating circuit involved. Although the square wave 603 is illustrated as a complex square wave, which is correct for the murmur networks, it would have a repetition rate of 40 or 80 c.p.s. in the heart sound network since the carrier signal is obtained either from binary element A or binary element O. The gating signal applied from the NOR gates associated with the various diode modulating circuits is shown at 604, while the resulting gated square wave is shown at 605. The heart sound envelope modulating signal at the output of the integrating circuit 310 would be an analog signal such as that shown at 600, for example. The modulated signals appearing at the outputs of the diode modulators may be represented by the waveform 606, while the resulting filtered signal used to represent the appropriate heart sound may be represented by waveshape 607, for example. The foregoing wave shapes are not intended to graphically portray the actual signals involved, since it will be appreciated that the actual $S_1$ and $S_2$ heart sound signals produced will be more complex because of the effects of modulation and so forth.

The diastolic murmur signal applied to summing resistor 385 of the summing amplifier 380 of the heart sound network is derived from diastolic murmur network 400, which is illustrated in FIGURE 11 of the drawings. As seen in FIGURE 11, the murmur position switch 41, which is located on the "diastolic" side of the simulator control panel, is arranged to receive the true and false outputs of binary elements B through G of the first ripple counter in timing network 100 and to produce a 6 bit binary coded output which is unique for each switch position. In practice, murmur position switch 41 may comprise two octal coded switches of the same type utilized for split $S_2$ switch 32. Each of the two octal coded switches will have eight numbered positions ranging from 0 to 7 and each will provide a 3 bit output which is applied to NOR gate 401. Although the murmur position switch 41 may be set from numerical values of 00 to 77, a limit is placed on the number of switch positions which may be utilized by the setting of heart rate switch 31. Since the heart rate switch determines by its setting the highest binary number to which the first binary ripple counter may count, it follows that the output of murmur position switch 41 which consists of a 6 bit coded output selected from binary elements B through G may not exceed the number so set. NOR gate 401, which may conveniently comprise a commercially available unit such as the aforementioned Signetics Semiconductor, Inc. type LU 314, for example.

has its output connected to the set input of binary element 402 which has a true output R and a false output $\overline{R}$. Binary element R, which may comprise the same commercially available units as the binary elements used in the timing network, has its clock input connected to the output of a clock generator 501 located in the murmur frequency network shown in FIGURE 14 of the drawings. The clock generator 501 may, for example, comprise an astable multivibrator with a 1,000 c.p.s. output, as illustrated. The true output from binary element R is coupled to one input 403 of a modified voltage switch 404, which will be described in detail hereinafter. The true output from binary element R is also applied to an AND gate 405, which may conveniently comprise a commercially available unit such as one-half of a type LU 306 dual AND gate manufactured by Signetics Semiconductor, Inc., the circuit diagram of which is shown in FIGURE 19 of the drawings, or equivalent. The output of AND gate 405 is applied to the set input of a binary element 406, which may be of the same type as binary element R, and which will provide a true output S and a false output $\overline{S}$. The true output of binary element S is applied to the other input 407 of the modified voltage switch 404 and also to NOR gate 401 and to the reset input of binary element R. Binary element S receives its clock input from the clock generator 501 in the same manner as binary element R. Modified voltage switch 404 has one output 408 connected to the input of an integrating circuit 409 formed by operational amplifier 410 and feedback capacitor 411, through a variable resistance 412 and a fixed resistance 413. A second output 414 of the modified voltage switch is applied to the input of the integrating circuit 409 through a variable resistance 415 which is ganged to variable resistance 412 and through a fixed resistance 416. Variable resistances 412 and 415 are mechanically coupled to knob 45 on the simulator control panel and function to control the duration of the diastolic murmur. For reasons which will be explained hereinafter, variable resistance 415 and fixed resistance 416 are shunted by the series connected combination of a resistor 417 and contacts 471C of a decrescendic relay 471.

The circuit diagram of modified voltage switch 404 is shown in FIGURE 12 of the drawings wherein it is seen to comprise transistors 421, 422, 423, 424, and 425, which are coupled in substantially the same manner as the corresponding transistors used in the voltage switches of the ECG and heart sound networks, with the exception that the modified voltage switch has two outputs instead of a single output. If the applied inputs $V_1$ and $V_2$ to the voltage switch are both low, transistors 421, 422, 423, 424, and 425 are all cut off and the output voltages $V_{01}$ and $V_{02}$ are both 0 volts. If input $V_2$ becomes high and input $V_1$ remains low, transistors 423, 424 and 425 become saturated and output $V_{02}$ will become a negative voltage $-V_M$, the magnitude of which depends upon the voltage divider formed by resistors 426 and 427. If input $V_1$ becomes high and input $V_2$ becomes low, transistors 421 and 422 become saturated and output voltage $V_{01}$ becomes a positive voltage $V_M$, the magnitude of which depends upon the voltage divider formed by resistors 428 and 429. If $V_1$ and $V_2$ are both high, the first output $V_{01}$ will be $+V_M$ volts and the second output $V_{02}$ will be a negative voltage $-V_M$.

Referring again to FIGURE 11 of the drawings, a reset switch 430, which may take the same form as the reset switches utilized in the ECG and heart sound networks, is provided to reset integrator circuit 409 and is controlled by a NOR gate 431 which receives its input from the true sides of binary elements R and S. NOR gate 431 may comprise any commercially available gate, such as one-half of the aforementioned Signetics type LU 315 dual NOR gate. The output of the integrator circuit 409 is applied to an input 432 of a first level detector 433 and to an input 434 of a second level detector 435. The first level detector 433 has its other input 436 connected to a D.C. reference voltage source $+V_{R1}$ and its output connected to the input of AND gate 405. The second level detector 435 has its other input 437 connected to a source of reference voltage $-V_{R2}$ and its output connected to the reset input of binary element S which is in synchronism with the clock. Level detectors 433 and 435 each comprise a circuit which compares the magnitudes of two analog signals applied to its inputs and produces low or high logic signals at its output depending upon the relative magnitudes of the applied analog signals. As seen in FIGURE 13 of the drawings, a suitable level detector circuit would comprise transistors 441, 442, 443, 444, and 445. Transistor 443 is biased by a diode 446 and resistors 447 and 448 to function as a current source which supplies current to transistors 441 and 422 which are differentially connected. The output of transistor 442 is applied to the base input of transistor 444 which functions to control output transistor 445. The collector-emitter circuit of transistor 445 is serially connected with a resistance 449 between ground and a D.C. supply voltage source $+E_1$ to form a voltage divider circuit, the output of which is taken from the collector of transistor 445. In operation, if an input voltage $V_1$, which is applied to the first input, is greater than a reference voltage $V_R$ which is applied to the second input, transistor 441 consumes all available current supplied by transistor 443 and transistors 442, 444, and 445 are all cut off. With transistor 445 cut off, its relatively high collector-emitter circuit resistance causes the output of the voltage divider formed by the collector-emitter resistance and resistor 449 to be high and therefore represent a binary 1 condition. If the input voltage $V_1$ applied to input 1 is less than the reference voltage $V_R$ applied to input 2, transistor 442 consumes all the current available from transistor 443 and the collector voltage at transistor 442 drops to allow transistors 444 and 445 to become saturated. When transistor 445 is saturated, its collector-emitter circuit resistance drops with the result that the output of the aforemenioned voltage divider falls toward ground potential and may therefore represent a binary O condition.

Referring again to FIGURE 11 of the drawings, it will be seen that the output from integrator circuit 409 is also applied to a diode modulator circuit 460 comprising diodes 461, 462, 463, 464, 465, and 466, a voltage dropping resistor 467 connected to a D.C. supply source $+E_1$, and an output potentiometer 468 which is mechanically coupled to the diastolic murmur amplitude control knob 44 on the simulator control panel. Diode 462 of the modulator circuit is connected to the false side $\overline{S}$ of binary elements S through contacts 470B of a relay 470 which is controlled by push button switch 37 on the diastolic murmur side of the simulator control panel. Diode 463 of the modulator is connected to the false side $\overline{R}$ of binary element R through contacts 471B of a relay 471 which is controlled by push button 38 on the simulator control panel. Diode 464 of the modulator circuit is connected to the output of a NOR gate 473 through contacts 472B of a relay 472 which is controlled by push button 39 on the simulator control panel. NOR gate 473, which may be of the same type as NOR gate 431, receives its output from NOR gate 431 which is controlled by the true outputs of binary elements R and S. The output of NOR gate 473 is also applied through a lead 474 to a terminal 475 of relay switch 476B of a relay 476 which is controlled by push button 40 located on the simulator control panel. The other terminal 477 of switch contacts 476B is connected to the output of integrator circuit 409.

Diode 465 is connected to receive carrier signals to be modulated which are generated in the murmur frequency network 500 shown in FIGURE 14 of the drawings. As seen in FIGURE 14, diode 465 of the modulator circuit is connected to the output of a NOR gate 502, which may be a commercially available unit of the same type as NOR gates 431 and 473, for example. NOR gate 502 receives its input from diastolic murmur frequency switch 46 which is located on the control panel of the simulator. This switch, which may conveniently comprise a commercially available two-pole, three-position wafer switch, for example, is arranged to receive the outputs of astable multivibrators 503, 504, 505, 506, and 507. The astable multivibrators 503 through 507 are so arranged that each one produces a square wave output having a different pulse repetition rate which is applied to the contacts of the diastolic murmur frequency switch 46. For example, multivibrator 503 may be set at 30 c.p.s., multivibrator 504 at 50 c.p.s., multivibrator 505 at 80 c.p.s., multivibrator 506 at 90 c.p.s., and multivibrator 507 at 100 c.p.s. As may be seen from the Switch Programming Chart of FIGURE 14 of the drawings, when the murmur frequency switch 46 is set to the low position, its two-pole output fed to NOR gate 502 will comprise the 30 cycle square wave from multivibrator 503 and the 50 cycle square wave from multivibrator 504. Similarly, in the medium position, the outputs will consist of the 50 cycle square wave from multivibrator 504 and the 80 cycle square wave from multivibrator 505, with the high position comprising the 90 c.p.s. and 100 c.p.s. square waves respectively derived from multivibrators 506 and 507. The outputs of multivibrators 503 through 507 also supply a systolic murmur frequency switch 46' which may be identical to the diastolic murmur frequency switch 46. The systolic murmur frequency switch 46' applies its output to a NOR gate 502' which supplies a source of carrier signals to be modulated to the systolic murmur network 400'. In operation, the setting of the diastolic murmur frequency switch 46 determines the frequency content or pitch of the murmur sound signals generated by the diastolic murmur network 400. If desired, any number of switch positions may be provided to accommodate a wider range of murmur pitch adjustment or the pulse repetition rates of multivibrators 503 through 507 could be adjusted to vary the frequency of the complex square wave produced at each switch position. It will be apparent that the frequency content or pitch of the murmur sound signals produced in the diastolic murmur network and the systolic murmur network may be independently adjusted.

Referring again to FIGURE 11 of the drawings, the diastolic murmur configuration controls are seen as comprising push buttons 37, 38, 39 and 40, which are located on the simulator control panel. Each of these push buttons is arranged to control an associated relay and a small panel lamp located behind that push button on the simulator control panel. Accordingly, push button 37, which controls the production of a crescendic-shaped murmur, is arranged to control relay 470 and a panel lamp 480, which is connected in parallel circuit with the relay coil. The relay 470 is provided with a sealing contact 470A, which is employed to keep the relay coil and associated panel lamp energized after push button 37 is released, and with a second contact 470B, which was described with reference to the modulator circuit 460. Push button 38, which controls the production of a decrescendic-shaped murmur, is arranged to control relay 471 and associated panel lamp 481. Relay 471 has a sealing contact 471A, a contact 471B located in the diode modulator circuit 460, and a contact 471C located in the input circuit to integrator 409. Push button 39 controls the production of diamond-shaped murmurs and is arranged to control relay 472 and associated panel lamp 482. Relay 472 is provided with a sealing contact 472A and a previously described contact 472B located in the diode modulator circuit. Push button 40, which controls the production of a plateau-shaped murmur, is seen to control a relay 476 and a panel lamp 483. Relay 476 is provided with a sealing contact 476A and a single-pole, double-throw contact 476B, which has been described with referece to the diode modulator circuit. Push buttons 37 through 40 and their associated circuits are interlocked so that when one push button is actuated, it will energize the relay and panel lamp associated with it and will deenergize the relay and panel lamps associated with the other push buttons. For example, assuming that push button 37 is depressed, it will bridge contacts 37A associated with it and will connect the coil of relay 470 and the panel lamp 480 between ground and a supply voltage source $+E_2$ through a circuit comprising lead 484, push buttons 40, 39, and 38, lead 485, the relay coil and panel lamp, leads 486 and 487, switch contacts 37A, and lead 488. Sealing contacts 470A will then close and since these contacts are in parallel circuit with switch contacts 37A, relay 470 and panel lamp 480 will remain energized when push button 37 is released. Since the energizing circuit for relay 470 and panel lamp 480 includes the series-connected upper contacts of push buttons 38, 39 and 40, which are normally bridged when the push buttons are not in a depressed position, it will be apparent that relay 470 and lamp 480 will be deenergized when any one of these push buttons is depressed.

It may be noted that relay 476 and panel lamp 483, which are associated with plateau push button 40, are not connected to the supply voltage source $+E_2$ through any of the other push button contacts, but are connected directly to the supply voltage source. When push button 40 is depressed, a circuit is completed from the suply voltage source $+E_2$, shown at the bottom of the circuit diagram, through the relay 476 and panel lamp 483, a lead 489, the lower contacts 40A of the push button switch 40, and lead 488 to ground, which energizes the relay and lamp and causes the movable contact of sealing contacts 476A to move to its lower position. When push button 40 is released, contacts 40A are no longer bridged, but relay 476 and panel lamp 483 remain energized because an energizing circuit is completed through sealing contacts 476A, 472A, and 471A, push button switch 37 and ground lead 488. If push button 37 were then to be depressed, it would directly break the energizing circuit for relay 476 and lamp 483. If either of push buttons 38 or 39 were to be depressed, the energizing circuit for relay 476 and lamp 483 would be broken when the movable contact of the sealing contacts associated with that push button moved to its lower position. The electrical interlock arrangement described serves to insure that only one of the four murmur configuration push buttons 37 through 40 may be effective at any given time to control the configuration of the murmur signal being produced by the diastolic murmur network 400.

The systolic murmur network 400' has not been illustrated since it is identical in construction and operation to the diastolic murmur network 400. The same reference characters, but with a prime notation, have been employed to identify the controls for the systolic network which are located on the simulator control panel. It may be pointed out, however, that the two binary elements of the systolic murmur network, which correspond to binary elements 402 and 406 of the diastolic murmur network, receive their clock input from clock generator 501 of the murmur frequency network and that the carrier signals to be modulated, which are applied to the diode modulator of the systolic network are obtained from NOR gate 502' of the murmur frequency network. All of the controls for the systolic murmur network 400', including murmur configuration push buttons 37' through 40', amplitude control knob 44', duration control knob 45', murmur position switch 41', and murmur frequency switch 46' are completely independent of the corresponding controls used for control of the diastolic murmur network 400 and may be used to generate a murmur of the same or different type as the murmur generated by the diastolic murmur network. Since murmur position switch 41' of the systolic murmur network receives its input from binary elements B through G of the first ripple counter in timing network 100 in the same manner as murmur position switch 41 of the diastolic murmur network, it may position a murmur anywhere in the cardiac cycle. For example, the systolic murmur network could produce a murmur in the total diastole period of the cardiac cycle and the diastolic murmur network could produce a murmur in the total systole period of the cardiac cycle. The legends "systolic" and "diastolic" applied to the controls for these two murmur networks on the simulator control panel have been utilized for convenience only in identifying the two groups of controls.

Since both murmur networks operate in the identical manner, in order to describe the operation of the networks, reference will be made only to the diastolic murmur network 400 shown in FIGURE 11 of the drawings. In describing the operation of murmur network 400, it will be assumed initially that murmur position switch 41 has been set to produce a 6 bit binary coded signal at its output which represents the beginning of the time interval of the cardiac cycle during which the murmur is to appear, and that push button 39 has been depressed to generate a diamond-shaped murmur. At this time, since both binary elements R and S are low, the outputs of the modified voltage switch 404 and the integrator circuit 409 will be zero volts and the outputs of level detectors 433 and 435 will be low. When push button 39 is depressed, relay 472 will be energized and held in an energized state by sealing contact 472A. The panel lamp 482 behind the push button will be lit and relay contact 472B in the diode modulator circuit 460 will be closed. When the first binary ripple counter formed by binary elements B through G of the timing network 100, during the course of its cyclic counting operation, reaches the particular 6 bit binary coded signal to which the murmur position switch 41 has been set, the output of NOR gate 401 will become high and will cause binary element R to go from low to high. The high or binary 1 signal from binary element R is applied simultaneously to three elements: the first is AND gate 405, the second is input 403 of modified voltage switch 404, and the third is NOR gate 431. The high signal applied to NOR gate 431 causes reset switch 430 to unblock the integrator circuit 409 and to permit it to operate. The high signal applied to input 403 of the modified voltage switch 404 causes it to apply a negative voltage $-V_M$ to the integrator circuit through variable resistance 415 and fixed resistance 416, it being noted that relay contacts 471C of the decrescendic relay are open at this time. The negative voltage applied to the input of the integrator circuit will cause its output to rise linearly until it exceeds a positive voltage of $V_{R1}$ which is the reference voltage applied to input 436 of level detector 433. When the reference voltage of level detector 433 is exceeded, the output of the level detector will go from low to high and will be applied to the input of AND gate 405 together with the already high signal from the true output of binary element R. The high signals applied to AND gate 405 produce a high signal at its output which is applied to the set input of binary element S and which causes the output of binary element S to become high. The high output of binary element S is applied to the reset input of binary element R causing it to be reset in synchronism with the clock. Although the resetting of binary element R causes its output to go from high to low, the reset switch 430 is prevented from operating to reset the output of integrator circuit 409 to zero, because the high signal from binary element S has been applied to NOR gate 431. The high output signal from binary element S is also applied to input 407 of the modified voltage switch 404 to cause a positive voltage of $+V_M$ to be applied to the input of integrator 409 through variable resistance 412 and fixed resistance 413. The positive voltage $+V_M$ applied to the input of integrator 409 causes the output of the integrator to decrease linearly. As the output voltage of the integrator decreases to a value less than the reference voltage $+V_{R1}$ applied to level detector 433, the output of this level detector will go from high to low. Since the positive output voltage from integrator 409 is also applied to input 434 of the second level detector 435, it will continue to decrease and will pass through zero volts and become negative until it exceeds the negative reference voltage $-V_{R2}$ which is applied to input 437 of the second level detector. At this time, the output of level detector 435 will go from low to high and will reset binary element S. Since both the outputs of binary elements R and S are now low, the reset switch 430 is activated by the output of NOR gate 431 to short circuit capacitor 411 and cause the output of integrator 409 to fall to zero volts.

The output of integrator circuit 409 is shown in FIGURE 15 of the drawings as comprising a triangular wave 600. It may be noted that the production of the leading edge 601 of this wave is controlled by binary element R, while the production of the trailing edge 602 of the wave is controlled by the binary element S. It may also be noted that the slope or rate of increase of portion 601 of the wave is directly related to the magnitude of the integrator input resistance produced by variable resistance 415 and fixed resistance 416, the relationship being such that, as the magnitude of the input resistance decreases, the slope or rate of change of portion 601 increases. Since the output of the integrator will increase until it exceeds the threshold or reference voltage applied to level detector 433, it is seen that the time $T_R$ during which the portion 601 is generated may be controlled by the setting of variable resistance 415. In a similar manner, the slope of the trailing edge 602 of the triangular wave and consequently the time duration $T_S$ of this portion of the wave may be controlled by the setting of variable resistance 412. In practice, fixed resistors 413 and 416 are selected to be of equal magnitude and variable resistances 412 and 415 are mechanically interconnected, so that the total resistance produced by resistances 412 and 413 always equals the total resistance produced by resistances 415 and 416, to thereby produce a wave having the shape of an isoceles triangle, as shown in FIGURE 15 of the drawings. Since the time duration of the wave 600 is $T_R+T_S$ and since $T_R=T_S$, it is apparent that adjustment of knob 45 on the simulator control panel will control the duration of the murmur modulating signal from integrator 409 and hence the duration of the murmur sound signal produced. With the murmur duration knob 45 set at zero, i.e., with the variable resistances 412 and 415 completely cut out, the input resistance to the integrator circuit will consist solely of resistors 413 and 416, which are so selected as to produce a minimum murmur duration of approximately 50 milliseconds. Accordingly, the murmur duration can be adjusted in the case of diamond and plateau-shaped murmurs from this minimum 50 ms. value to a maximum duration. Since the setting of the heart rate switch determines the cyclic repetition rate and consequently the total duration of the cardiac cycle, it is apparent that the murmur duration should not exceed that of the cardiac cycle or an irregular murmur will be produced. The inclusion of fixed resistors 413 and 416 in the input circuit to the integrator 409 to produce a minimum murmur duration is intended to provide a simple means for the generation of short duration murmurs, which may be only varied in amplitude. Accordingly, when the murmur amplitude control knob 44 is turned up from a setting of zero, a minimum murmur duration of 50 milliseconds is produced, even though the murmur duration knob 45 is set at zero.

It should be pointed out that the negative reference voltage $-V_{R2}$ which is applied to input 437 of the second level detector 435 may actually be set at zero volts, since its function is to terminate the production of the trailing edge 602 of the triangular wave 600 at the reference level of zero volts. In practice, however, this reference voltage is made slightly negative, on the order of a few tenths of a volt, to compensate for spurious signal generation and integrator drift.

The triangular wave 600, shown in FIGURE 15 of the drawings, will be repeated once during each complete cardiac cycle and its position in the cardiac cycle will be determined by the setting of murmur position switch 41.

Since the time duration $T_R+T_S$ of this wave is determined by the setting of variable resistances 412 and 415, it follows that the setting of the murmur position switch establishes only the starting point of the wave in the cardiac cycle. The triangular wave 600 from the output of integrator 409 is applied to diode modulator 460 through fixed contact 477 of relay switch contacts 476B where it serves to modulate the complex square wave applied to diode 465 by NOR gate 502 of the murmur frequency network. As previously described, the murmur frequency switch 46 may be set to determine the repetition rates of the pulses forming the complex square wave output from NOR gate 502 to thereby determine the pitch or frequency of the murmur. Because of the modulation process, which introduces frequency side bands, the actual frequency content of the murmur signal will be very complex and will consist of a range of frequencies which closely approximate the frequency content of clinically observed murmurs. The diode modulator 460 is gated to provide an output from potentiometer 468 only during the time when either binary element R or binary element S is high. This function is performed by NOR gates 431 and 473 which apply the gating signal composed of the true outputs R and S of the binary elements to diode 464 through relay contacts 472B of the diamond relay 472. With this set of contacts closed, these elements act as a clamping circuit so that when either binary element R or S is high, a gating signal is produced which will permit the output of diode modulator circuit 460 to appear at potentiometer 468. In FIGURE 15 of the drawings, waveform 603 represents the complex square wave from NOR gate 502 of the murmur frequency network, waveform 604 represents the gate signal from NOR gate 473, and waveform 605 is the resulting gated square wave. Since the modulating signal produced by integrator 409 is also controlled by binary elements R and S, the gated square wave 605 will be modulated by the triangular waveform 600 to produce the basic diamond-shaped murmur signal shown as waveform 606. This signal appears at the wiper of potentiometer 468 and is applied to summing resistor 385 of the summing amplifier 380 in the heart sound network. The murmur signal is then passed through low pass filter 391 to provide the filtered murmur signal shown as waveform 607. By virtue of this arrangement, the diamond-shaped murmur produced may be controlled as to amplitude, duration, and frequency, and as to its position in the cardiac cycle.

In order to generate a crescendic-shaped murmur, push button 37 is depressed to energize relay 470 and panel lamp 480 and to deenergize any other relay or panel lamp which may be energized at that time. The energization of relay 470 causes its contacts 470B in the diode modulator circuit 460 to close, thereby connecting diode 462 with the false or $\overline{S}$ output of binary element S. In operation when the binary coded output signal determined by the setting of murmur position switch 41 is reached by the first binary ripple counter during the course of its cyclic counting operation, NOR gate 401, binary element R, and modified voltage switch 404 will cooperate to cause integrator 409 to produce the leading edge 601 of the triangular wave shape 600 shown in FIGURE 15 of the drawings. When the output from integrator 409 exceeds the reference voltage $+V_{R1}$ of level detector 433, binary element R becomes low and binary element S becomes high, to thereby cause the integrator 409 to produce the trailing edge 602 of the triangular wave 600. Since the false output $\overline{S}$ of binary element S is low, i.e., a binary 0 condition, and since this is applied to diode 462 of the modulator 460, the complex square wave from NOR gate 502 of the murmur frequency network flows through diode 462 and does not reach the output potentiometer 468, so that the only signal which appears at potentiometer 468 consists of the rising slope portion of the diamond-shaped murmur, which is a crescendic-shaped murmur. Since the crescendic-shaped murmur appearing at potentiometer 468 is produced by the operation of binary element R and since no output appears at the potentiometer during the time that binary element S is high, it will be apparent that the maximum duration of a crescendic-shaped murmur may be only one-half of the maximum duration of a diamond-shaped murmur.

When it is desired to produce a decrescendic-shaped murmur, push button 38 is depressed to actuate relay 471 and panel lamp 481. This causes relay contacts 471B in the modulator circuit to close and to connect diode 463 to the false or $\overline{R}$ side of binary element R. At the same time, relay contacts 471C are closed in the input to integrator circuit 409 to thereby cause resistor 417 to shunt the series combination of variable resistance 415 and resistor 416. When the first binary ripple counter reaches the binary coded signal determined by the setting of the murmur position switch 41, NOR gate 401 and binary element R will cause modified voltage switch 404 to produce the negative voltage $-V_M$ at its output 414. This voltage is applied to the input of integrator 409 to produce a linearly rising voltage at the output of the integrator corresponding to the leading edge 601 of triangular wave 600. However, since resistor 417 is now shunted across the series combination of variable resistance 415 and fixed resistor 416, the input resistance to the integrator is drastically reduced so that the slope or rate of rise of the integrator output voltage is very greatly increased, with the result that the integrator voltage rises very quickly from zero volts to the voltage which causes level detector 433 to operate. Accordingly, the time $T_R$ during which binary element R is high is exceedingly short, so that the production of the decrescendic-shaped murmur will begin almost immediately after the 6 bit signal determined by the setting of murmur position switch 41 is reached by the first binary ripple counter in the timing network. Furthermore, during this time, the $\overline{R}$ or low input to diode 463 in the modulator circuit 460 causes the complex square wave to be modulated to be passed through the diode 463 and relay contacts 471B, so that no output reaches the potentiometer 468. When the output voltage from integrator 409 rises to a magnitude which actuates level detector 433, binary element S becomes high and causes modified voltage switch 404 to produce a positive voltage $+V_M$ at its output 408. This positive voltage is applied through variable resistance 412 and fixed resistor 413 to the integrator 409 to produce the trailing edge 602 of the triangular wave 600. Since variable resistance 412 and fixed resistor 413 are not shunted by resistor 417, the rate of decrease of the integrator voltage and therefore the murmur duration, may be controlled by the setting of variable resistance 412. Since the false or $\overline{R}$ input to diode 463 of the modulator circuit 460 permits the output of the circuit to reach potentiometer 468 only during the time that binary element S is high, the modulated output appearing at potentiometer 468 will consist only of the last half of the diamond-shaped murmur which is, in reality, a decrescendic-shaped murmur.

The production of a plateau-shaped murmur is accomplished by depressing push button 40 which will immediately energize relay 476 and associated panel lamp 483 and will deenergize any previously energized relay and panel lamp. When relay 476 is energized, relay switch contact 476B in the diode modulator circuit 460 will be moved from fixed contact 477 to fixed contact 475. This will disconnect the input of the modulator circuit 460 from the output of the integrator circuit 409 and will connect it to the output of NOR gate 473 through lead 474. Assuming initially that binary elements R and S are low, the output from NOR gate 431 will be low and reset switch 430 will be operative to reset the output of integrator circuit 409 to zero. The low output from NOR gate 431 is applied through NOR gate 473 to the diode modulator circuit 460 through lead 474 and acts as a clamp to prevent the square wave output from NOR gate 502 of the murmur frequency network from reaching the output potentiometer 468. When the first binary ripple counter in the timing network 100 reaches the 6 bit binary coded signal, to which murmur position switch 41 is set, NOR gate 401, binary element R, and modified voltage switch 404 will cooperate to cause integrator circuit 409 to produce the leading edge 601 of the triangular waveform 600, shown in FIGURE 15 of the drawings. During this time, however, the output voltage from the integrator is not applied to the modulator circuit because relay switch cotnact 476B is connected to fixed contact 475. The high output from binary element R is applied to NOR gate 431 and causes the output of NOR gate 473 to go high to thereby permit the complex square waves produced by NOR gate 502 of the murmur frequency network to be supplied to output potentiometer 468. During this time, the only modulating signal which is applied to the complex square waves is the output of NOR gate 473 which is a constant amplitude voltage pulse which lasts as long as binary element R is high. When the output of integrator 409 exceeds the reference voltage $+V_{R1}$ of level detector 433, binary element S will become high and binary element R will be reset to a low output. During the period that binary element S is high, the output of the integrator circuit will decrease until it falls lower than the negative reference voltage $-V_{R2}$ applied to level detector 435, at which time binary element S will be reset to its low condition. Again, during the time that binary element S is high, the output from integrator 409 is not applied to the modulator circuit 460, so that the only modulating signal applied is the constant amplitude pulse output of NOR gate 473. Since it is the high output of binary element S which resets binary element R, the output of NOR gate 473 remains constant during the time that binary element R and binary element S is high. During this period, the diode modulator 460 modulates the complex square wave from the murmur frequency network with a constant amplitude voltage from the output of NOR gate 473 to thereby produce a flat or plateau-shaped murmur. When binary elements R and S return to their low condition, the output of NOR gate 473 becomes low and the complex square waves applied to diode 465 are prevented from reaching the output of potentiometer 468. At the same time, reset switch 430 will operate to reset the output of integrator 409 to zero. The circuit will then remain in this condition until the first binary ripple counter in the timing network against reaches the 6 bit binary coded signal to which the murmur position switch 41 is set, to thereby generate a new murmur. Since, as explained previously, the adjustment of variable resistances 412 and 415 by knob 45 on the simulator control panel serves to control the times that binary elements R and S are high, it is apparent that knob 45 will also control the duration of the plateau-shaped murmur.

Referring again to FIGURE 10 of the drawings, it is seen that the murmur signals generated by the diastolic murmur network 400 and the systolic murmur network 400′ are applied to summing resistors 385 and 386 of summing amplifier 380, so that the complete output of the summing amplifier consists of the normal heart sounds $S_1$, $S_2$ $(A_2+P_2)$ and the murmur signals produced by the murmur networks. By virtue of this arrangement, the inevery normal and abnormal heart condition which the student is apt to encounter in clinical observations. Furthermore, since the simulator controls are calibrated and since the digital techniques employed offer a very high degree of accuracy in generation and location of the various normal and abnormal heart sounds, a particular heart sound pattern may be repeated with great accuracy at any time desired by the instructor. Since a single loudspeaker or a plurality of stethophones may be employed to reproduce the sound signals, it is apparent that a single simulator may be used to train a large number of students at a given time. Furthermore, the extremely wide variety of heart sound patterns to which the students may be exposed permits the students to reach a high degree of efficiency in auscultation in the shortest possible time. The basic ECG signal which is supplied by the simulator may be applied to an oscilloscope for individual or group presentation. Additionally, it is desired to directly compare the mechanical and electrical workings of the heart, both the basic ECG and the heart sound signals produced by the simulator may be applied to a twin beam oscilloscope or to a twin channel pen recorder for visual observation, so that the student may be made aware of the relationship existing between the electrical and mechanical phenomena associated with the heart muscle. It may also be observed that the heart sound simulator of the invention is composed of components of relatively small size and weight so that the over-all size and weight of the complete simulator may be made extremely small to permit of maximum portability and use.

From the foregoing description, it is believed apparent that many changes could be made in the above construction and many apparently widely different embodiments of the invention could be made without departing from the scope thereof. For example, logic other than the basic NOR logic employed in the digital portions of the simulator, could be utilized in accordance with accepted Boolean theorems and circuit components, other than those disclosed, could be utilized. Similarly, methods of modulation, such as those utilizing a distributed frequency spectrum signal, for example, could be employed in place of the disclosed amplitude modulation to generate the $S_1$ and $S_2$ heart sound and murmur signals, to thereby facilitate the radio or closed-circuit distribution of these signals to widely separated groups of students. Additionally, it is believed to be apparent that the disclosed method and apparatus could be employed to simulate the heart sounds of animals as well as humans. It is therefore intended that all matter contained in the above description or shown in the accompanying drawings shall be interpreted as illustrative and not in a limiting sense.

What is claimed is:

1. The method of simulating heart signal patterns comprising the steps of cyclically generating a plurality of sequentially occurring uniquely digitally coded signals at a cyclic repetition rate equal to the desired heart rate, so that said coded signals are digitally coded to represent the succeeding time intervals of the desired heart signal pattern;

generating electric analog signals corresponding to the heart signals forming the desired heart signal pattern in response to those digitally coded signals which represent the beginning of the time intervals of the desired pattern at which the heart signals occur;

combining the said electric analog signals to produce an electric analog heart pattern signal corresponding to the desired heart signal pattern; and applying said electric analog heart pattern signal to presentation means, to thereby produce the simulated heart signal pattern.

2. The method of simulating heart sound patterns comprising the steps of cyclically generating a plurality of sequentially occurring uniquely digitally coded signals at a cyclic repetition rate equal to the desired heart rate, so that said signals are digitally coded to represent the succeeding time intervals of the desired heart sound pattern;

generating audio frequency heart sound signals corresponding to the heart sounds forming the desired heart sound pattern in response to those digitally coded signals which represent the beginning of the time intervals of the desired pattern at which the heart sounds occur;

combining the said audio frequency heart sound signals to produce an audio frequency heart sound pattern signal corresponding to the desired heart sound pattern; and applying said audio frequency heart sound pattern signal to presentation means.

3. The method of claim 2 wherein each of said audio frequency heart sound signals is generated by amplitude modulating a carrier signal having a frequency content which will produce the desired sound after modulation and wherein the modulating signal employed is an analog signal derived from the digitally coded signals associated with the production of that heart sound signal.

4. The method of simulating heart sound patterns comprising the steps of cyclically generating a first group of sequentially occurring uniquely digitally coded signals at a cyclic repetition rate equal to desired heart rates, so that said signals are digitally coded to represent the succeeding time intervals of the desired heart sound pattern;

cyclically generating a second group of sequentially occurring uniquely digitally coded signals in response to a selected digitally coded signal from said first group, so that said second group of signals has a cyclic repetition rate equal to the cyclic repetition rate of said first group of signals but starts its cycle at the beginning of the time interval of the desired heart sound pattern represented by said selected digitally coded signal, the selection of the digitally coded signal from the first group being determined by the desired heart rate such that the faster the heart rate the earlier in point of time of the desired heart sound pattern the cyclic generation of the second group of coded signals will begin, to thereby reflect the decrease in systolic interval resulting from an increase in heart rate;

generating an audio frequency heart sound signal corresponding to the $S_1$ heart sound of the desired heart sound pattern in response to digitally coded signals from said first group which represent the beginning of the time interval of the desired pattern at which the $S_1$ heart sound occurs;

generating separate audio frequency heart sound signals corresponding to the $A_2$ and $P_2$ portions of the $S_2$ heart sound of the desired heart sound pattern in response to digitally coded signals from said second group which represent the beginning of the time intervals of the desired pattern at which the $A_2$ and $P_2$ portions of the $S_2$ heart sound occur, to thereby reflect the split $S_2$ condition;

combining the said audio frequency signals corresponding to the $S_1$ and $S_2$ heart sounds to produce an audio frequency heart sound pattern signal corresponding to the desired heart sound pattern; and applying said audio frequency heart sound pattern signal to presentation means, to thereby produce the desired heart sound pattern.

5. The method of claim 4 comprising the additional steps of generating the P wave and R wave portions of a simulated basic electrocardiogram signal corresponding to the desired heart sound pattern in response to digitally coded signals from said first group of signals which represent the beginning of the time intervals of the desired heart sound pattern at which the simulated P and R waves occur;

generating the T wave portion of a simulated basic electrocardiogram signal corresponding to the desired heart sound pattern in response to digitally coded signals from said second group of signals which represent the beginning of the time interval of the desired heart sound pattern at which the simulated T wave occurs;

combining the said P, R and T wave signals to produce a simulated basic electrocardiogram signal; and applying said simulated basic electrocardiogram signal to visual presentation means, to thereby provide a basic electrocardiogram pattern having the same heart rate as the desired heart sound pattern and with the simulated P, R and T wave portions in proper time phase relationship to the $S_1$ and $S_2$ heart sounds.

6. The method of claim 4 comprising the additional steps of generating an audio frequency heart murmur signal in response to digitally coded signals from said first group of signals which represent the beginning of the time interval of the desired heart sound pattern at which a desired heart murmur begins; and combining said audio frequency heart murmur signal with the said audio frequency signals corresponding to the $S_1$ and $S_2$ heart sounds, to thereby produce an audio frequency heart sound patterns signal corresponding to an abnormal heart condition.

7. The method of claim 6 wherein each of said audio frequency signals corresponding to the heart murmur and the $S_1$ and $S_2$ heart sounds is generated by deriving an analog signal corresponding to the envelope of the desired audio frequency signal from the digitally coded signals associated with the production of that audio frequency signal;

amplitude modulating with said analog signal a carrier signal having a frequency content which will produce the desired sound after modulation; and controlling the production of the resulting modulated signal in response to the said digitally coded signals associated with the production of that audio frequency signal, to thereby prevent the presentation of unmodulated carrier signals during the absence of a modulating signal.

8. The method of producing a simulated basic electrocardiogram comprising the steps of cyclically generating a first group of sequentially occurring uniquely digitally coded signals at a cyclic repetition rate equal to desired heart rates, so that said signals are digitally coded to represent the succeeding time intervals of the desired cardiac cycle;

cyclically generating a second group of sequentially occurring uniquely digitally coded signals in response to a selected digitally coded signal from said first group, so that said second group of signals has a cyclic repetition rate equal to the cyclic repetition rate of said first group of signals but starts its cycle at the beginning of the time interval of the desired cardiac cycle represented by said selected digitally coded signal, the selection of said selected digitally coded signal from said first group being determined by the desired heart rate such that the faster the heart rate the earlier in point of time of the desired cardiac cycle the cyclic generation of the second group of coded signals will begin, to thereby reflect the decrease in systolic interval resulting from an increase in heart rate;

generating analog signals corresponding to the P wave and R wave portions of the desired basic electrocardiogram in response to digitally coded signals from said first group of signals which represent the beginning of the time intervals of the desired cardiac cycle at which the simulated P and R waves occur;

generating an analog signal corresponding to the T wave portion of the desired basic electrocardiogram in response to digitally coded signals from said second group of signals which represent the beginning of the time interval of the desired cardiac cycle at which the simulated T wave occurs;

combining the said P, R and T wave analog signals to produce a simulated basic electrocardiogram signal; and applying the said simulated basic electrocardiogram signal to visual presentation means, to thereby provide a simulated basic electrocardiogram having the desired heart rate and the proper heart rate dependent time phase relationship between the T wave portion and the P and R wave portions.

9. Apparatus for producing a simulated heart signal pattern comprising:

timing means for cyclically generating a plurality of sequentially occurring uniquely digitally coded signals at a cyclic repetition rate equal to the desired heart rate, so that said coded signals are digitally coded to represent the succeeding time intervals of the desired heart signal pattern;

electric analog signal generating means responsive to those digitally coded signals from said timing means which represent the beginning of the time intervals of the desired pattern at which the heart signals begin for generating electric analog signals corresponding to said heart signals; and signal combining means for combining the said electric analog signals to produce an electric analog heart pattern signal corresponding to the desired heart signal pattern.

10. Apparatus for producing an audio frequency simulated heart sound pattern signal corresponding to a desired heart sound pattern and apparatus comprising:

timing means for cyclically generating a plurality of sequentially occurring uniquely digitally coded signals at a cyclic repetition rate equal to the desired heart rate, so that said signals are digitally coded to represent the succeeding time intervals of the desired heart sound pattern;

audio frequency signal generating means responsive to those digitally coded signals from said timing means which represent the beginning of the time intervals of the desired pattern at which the desired heart sounds begin for generating audio frequency heart sound signals corresponding to said heat sounds; and signal combining means for combining the said audio frequency heart sound signals to produce an audio frequency heart sound pattern signal corresponding to the desired heart sound pattern.

11. Apparatus as claimed in claim 10, further comprising:

heart rate control means coupled to said timing means for controlling the repetition rate of the simulated heart sound pattern signal, said control means comprising signal selection means for selecting a particular digitally coded signal from the output of said timing means, and means responsive to said particular digitally coded signal from the output of said timing means, and means responsive to said particular digitally coded signal for controlling said timing means to limit the output thereof to those digitally coded signals forming the sequence between the beginning of the cycle and the said particular digitally coded signal, to thereby control the duration of the cycle and the cyclic repetition rate.

12. Apparatus as claimed in claim 10 wherein the said audio frequency signal generating means for each of the audio frequency heart sound signals comprises:

digitally controlled analog signal generating means for producing an analog signal corresponding to the envelope of the desired audio frequency heart sound signal in response to those digitally coded signals from the output of said timing means which are associated with the production of that heart sound signal;

means for generating a carrier signal having a frequency content which will produce the desired sound of the audio frequency heart sound signal after modulation; and gated modulating means for amplitude modulating said carrier signal with said analog signal to produce the desired audio frequency heart sound signal, said modulating means being gated in response to the said digitally coded signals associated with the production of that heart sound signal to prevent the transmission of unmodulated carrier signals during the absence of an analog signal.

13. Apparatus as claimed in claim 10, wherein at least one of the heart sounds forming the desired heart sound pattern is a heart murmur and wherein the said audio frequency signal generating means for generating the audio frequency heart murmur signal comprises:

murmur position selection means coupled to the output of said timing means for selecting a particular digitally coded signal therefrom which represents the beginning of the time intervals of the desired heart sound pattern at which the desired murmur begins;

digitally controlled analog signal generating means responsive to said particular digitally coded signal for generating analog signals corresponding to the envelopes of the desired audio frequency heart murmur signals, each of said analog signals being generated only once during each cardiac cycle at the point in time of said cycle represented by said particular digitally coded signal;

means for generating a carrier signal having a frequency content which will produce the desired sound of the audio frequency murmur signal after modulation;

selectively gated modulating means for amplitude modulating said carrier signal with a modulating signal derived from said analog signals to produce the desired audio frequency heart murmur signal, said modulating means being selectively gated in response to said particular digitally coded signal to prevent the transmission of unmodulated carrier signals during the absence of a modulating signal; and murmur configuration control means coupled to said modulating means for selectively gating said moduating means and deriving a modulating signal from said analog signals to cause said modulating means to produce an audio frequency heart murmur signal having the desired murmur configuration.

14. Apparatus as claimed in claim 13, wherein said analog signal generating means generates a first analog signal substantially in the form of an isosceles triangle and a second analog signal in the form of a pulse of substantially constant amplitude, and wherein said murmur configuration control means has selectable modes of operation comprising a first mode in which the modulating signal is the first analog signal and the modulating means is gated to pass the entire resulting triangular-shaped modulated signal, to thereby produce a diamond-shaped heart murmur signal.

a second mode in which the modulating signal is the first analog signal and the modulating means is gated to pass only the half of the resulting triangular-shaped modulated signal which is formed by the leading edge of the modulating signal, to thereby produce a crescendic-shaped heart murmur signal, a third mode in which the modulating signal is the first analog signal and the modulating means is gated to pass only the half of the resulting triangular-shaped modulated signal which is formed by the trailing edge of the modulating signal, to thereby produce a decrescendic-shaped heart murmur signal, and a fourth mode in which the modulating signal is the second analog signal and the modulating means is gated to pass the entire resulting constant amplitude pulse-shaped modulated signal, to thereby produce a plateau-shaped heart murmur signal.

15. Apparatus as claimed in claim 14, wherein said analog signal generating means for generating the first analog signal comprises:

controlled integrator means operative to produce an analog signal at its output which is the integral with respect to time of an analog signal applied to its input, first logic control means coupled to said murmur position selection means for applying a constant amplitude analog signal to the input of said integrator means in response to said particular digitally coded signal from the murmur position selection means, to thereby cause the integrator means to produce the leading edge of the triangular first analog signal at its output, second logic control means coupled to the output of said integrator means and responsive to the magnitude of the analog output signal therefrom for deactivating said first logic control means and applying a constant amplitude analog signal of opposite polarity to the input of said integrator means when the analog output signal from the integrator means rises above a predetermined level, to thereby cause said integrator means to produce the trailing edge of the triangular first analog signal at its output, and third logic control means coupled to the output of said integrator means and responsive to the magnitude of the analog output signal therefrom for deactivating said second logic control means and resetting said integrator means to a predetermined reference level when the analog output signal therefrom falls below said reference level, to thereby maintain the said first analog signal generating means in a quiescent state until the next particular digitally coded signal is produced by said timing means.

16. Apparatus as claimed in claim 15, wherein said analog signal generating means for generating the second analog signal comprises:

fourth logic control means coupled to said first, second, and third logic control means and responsive to the activation of said first and second logic control means for producing a constant amplitude analog signal at its output whenever the said first or second logic control means is activated.

17. Apparatus as claimed in claim 15, wherein each of said first and second logic control means includes means for adjusting the magnitude of the constant amplitude analog signal therefrom which is applied to the input of said integrator means, to thereby control the respective rise and fall times of the leading and trailing edges of the triangular first analog signal and consequently the duration of the audio frequency heart murmur signal.

18. Apparatus as claimed in claim 15, wherein said murmur configuration control means includes means operable in the said third mode of operation thereof for substantially increasing the magnitude of the constant amplitude analog signal applied to the input of said integrator means by said first logic control means, to thereby substantially decrease the rise time of the leading edge of said triangular first analog signal and consequently cause the production of the decrescendic-shaped heart murmur signal to start almost immediately after the occurrence of the said particular digitally coded signal.

19. Apparatus as claimed in claim 18, wherein said selectively gated modulating means comprises a modulator circuit having a first input adapted to be coupled to one of said first and second analog signal generating means, a second input coupled to said carrier signal generating means, an output coupled to said signal combining means, a first gate circuit adapted to be coupled to said first and second logic control means and operable when either of said first and second logic control means is activated to pass the modulated signal output of the modulator circuit to said signal combining means, and second and third gate circuits each adapted to be coupled to a different one of said first and second logic control means, said second gate circuit being operable in response to activation of said first logic control means to pass the modulated output signal to said signal combining means and said third gate circuit being operable in response to activation of said second logic control means to pass the modulated output signal to said signal combining means, and wherein said murmur configuration control means includes means operable in the said first, second and third modes of operation thereof to couple the first input of the modulator circuit to the output of said integrator means and operable in the fourth mode of operation thereof to couple the first input of the modulator circuit to the output of said fourth logic control means, so that the constant amplitude modulating signal produced by said fourth logic control means also functions as a gate signal in said fourth mode of operation to pass the modulated output signal of the modulator circuit to the signal combining means whenever the said first or second logic control means is activated, means operable in the said first mode of operation thereof to couple the said first gate circuit to said first and second logic control means, means operable in the said second mode of operation thereof to couple the said second gate circuit to the logic control means associated therewith, and means operable in the said third mode of operation thereof to couple the said third gate circuit to the logic control means associated therewith.

20. Apparatus as claimed in claim 19, wherein each of said first and second logic control means includes a bistable circuit adapted to produce high and low amplitude logic signals in response to activation and deactivation of the logic control means associated therewith, said modulator circuit is a diode modulator circuit, and said gate circuits comprise clamping circuits controlled by the high and low amplitude logic signals of the logic control means associated therewith.

21. Apparatus as claimed in claim 19, wherein said carrier signal generating means comprises a plurality of carrier signal sources each having a different frequency, and means for combining the outputs of selected ones of said plurality of carrier signal sources, to provide carrier signals having different complex frequency content, to thereby permit the simulation of heart murmurs of various pitch.

22. Apparatus for producing an audio frequency simulated heart sound pattern signal corresponding to a desired heart sound pattern, said apparatus comprising:

first timing means for cyclically generating a first group of sequentially occurring uniquely digitally coded signals at a cyclic repetition rate equal to desired heart rates, so that said signals are digitally coded to represent the succeeding time intervals of the desired heart sound pattern;

second timing means responsive to a particular digitally coded signal from said first group of signals for cyclically generating a second group of sequentially occurring uniquely digitally coded signals at a cyclic repetition rate equal to the cyclic repetition rate of said first group of signals but having a cycle which starts at the beginning of the time interval of the desired heart sound pattern represented by said particular digitally coded signal;

heart rate responsive means coupled to said first and second timing means for selecting said particular digitally coded signal, the selection of the particular digitally coded signal being such that the faster the heart rate the earlier in point of time of the desired heart sound pattern the cyclic generation of the second group of coded signals will begin, to thereby reflect the decrease in systolic interval resulting from an increase in heart rate;

means coupled to the output of said first timing means for generating an audio frequency heart sound signal corresponding to the $S_1$ heart sound in response to digitally coded signals from said first group of signals which represent the beginning of the time interval of the desired heart sound pattern at which the $S_1$ heart sound begins;

means coupled to the output of said second timing means for generating an audio frequency heart sound signal corresponding to the $S_2$ heart sound in response to digitally coded signals from said second group of signals which represent the beginning of the time interval of the desired heart sound pattern at which the $S_2$ heart sound begins; and signal combining means for combining the said $S_1$ and $S_2$ audio frequency heart sound signals to produce an audio frequency heart sound pattern signal having the desired heart rate and the correct systolic interval for that heart rate.

23. Apparatus as claimed in claim 22, further comprising:

means coupled to the output of said first timing means for generating the P wave and R wave portions of a simulated basic electrocardiogram signal corresponding to the desired heart sound pattern in response to digitally coded signals from said first group of signals which represent the beginning of the time intervals of the desired heart sound pattern at which the simulated P and R waves begin;

means coupled to the output of said second timing means for generating the T wave portion of a simulated basic electrocardiogram signal corresponding to the desired heart sound pattern in response to digitally coded signals from said second group of signals which represent the beginning of the time interval of the desired heat sound pattern at which the simulated T wave begins; and means for combining the said P, R and T wave signals to produce a simulated basic electrocardiogram signal having the same heart rate as the desired heart sound pattern and with the simulated P, R and T wave portions in proper time phase relationship to the $S_1$ and $S_2$ heart sounds.

24. Apparatus as claimed in claim 22, wherein said means for generating the audio frequency $S_2$ heart sound signal comprises:

means for generating separate audio frequency signals corresponding to the $A_2$ and $P_2$ portions of the $S_2$ heart sound in response to digitally coded signals from said second group of signals which represent the beginning of the time intervals of the desired heart sound pattern at which the $A_2$ and $P_2$ portions of the $S_2$ heart sound begin; and means for selecting the digitally coded signals to which the $P_2$ signal generating means is responsive to permit adjustment of the time phase relationship of the $P_2$ signal with respect to the $A_2$ signal in the simulated cardiac cycle, to thereby permit simulation of split $S_2$ heart sound conditions.

25. Apparatus as claimed in claim 22, further comprising:

means coupled between the output of said first timing means and the input of said signal combining means for generating an audio frequency heart murmur signal corresponding to a simulated heart murmur in the desired heart sound pattern in response to digitally coded signals from said first group of signals which represent the beginning of the time interval of the desired heart sound pattern at which the murmur begins.

26. Apparatus as claimed in claim 22, wherein said means for generating the audio frequency heart sound signals corresponding to the $S_1$ and $S_2$ heart sounds comprises:

an integrator circuit operative to produce an analog signal at its output which is the integral with respect to time of an analog signal applied to its input;

first logic control means coupled to the output of said first timing means for applying discrete constant amplitude analog signals to the input of said integrator circuit in response to those digitally coded signals from said first group of signals which represent the beginning of the time interval of the desired heart sound pattern at which the $S_1$ heart sound begins, to cause said integrator circuit to produce at its output a first analog signal corresponding to the envelope of the $S_1$ heart sound;

second and third logic control means coupled to the output of said second timing means for applying discrete constant amplitude analog signals to the input of said integrator circuit in response to those digitally coded signals from said second group of signals which represent the beginning of the time intervals of the desired heart sound pattern at which the $A_2$ and $P_2$ portions of the $S_2$ heart sound begin, to cause said integrator circuit to produce at its output second and third analog signals corresponding respectively to the envelop of the $A_2$ portion of the $S_2$ heart sound and the envelope of the $P_2$ portion of the $S_2$ heart sound, said third logic control means including switch means for selecting the digitally coded signals responsible for the production of the third analog signal, to thereby permit the position of the $P_2$ portion of the $S_2$ heart sound in the cardiac cycle to be adjusted independently of the position of the $A_2$ portion of that sound and permit the simulation of split $S_2$ heart sound conditions;

means for generating first and second carrier signals, said first carrier signal having a frequency which will produce the desired sound of the $S_1$ heart sound after modulation, said second carrier signal having a frequency which will produce the desired sound of the $A_2$ and $P_2$ portions of the $S_2$ heart sound after modulation; and first, second and third gated modulating means coupled to the output of said integrator circuit, said first modulating means being operable to amplitude modulate said first carrier signal with said first analog signal to produce the $S_1$ audio frequency heart sound signal, said second modulating means being operable to amplitude modulate said second carrier signal with said second analog signal to produce the $A_2$ portion of the $S_2$ audio frequency heart sound signal, said third modulating means being operable to amplitude modulate said second carrier signal with said third analog signal to produce the $P_2$ portion of the $S_2$ audio frequency heart sound signal, and each of said modulating means being gated in response to the digitally coded signals responsible for the production of the heart sound signals associated therewith to prevent the transmission of unmodulated carrier signals during the absence of an analog modulating signal.

27. Apparatus as claimed in claim 22, further comprising heart rate control means coupled to said first timing means for controlling the repetition rate of the simulated heart sound pattern signal, said control means comprising means responsive to a second particular digitally coded signal from the output of said first timing means for controlling said first timing means to limit the output thereof to those digitally coded signals forming the sequence between the beginning of the cycle and the said second particular digitally coded signal, to thereby control the duration of the cycle and the cyclic repetition rate of said first group of signals, and signal selection means for selecting said second particular digitally coded signal from the output of said first timing means, the selection of the second particular digitally coded signal being such that the said sequence of coded signals from the first timing means includes the first-named particular digitally coded signal.

28. Apparatus as claimed in claim 27, wherein each of said first and second timing means includes a binary ripple counter formed by a plurality of chain-connected bistable logic circuits, each of said logic circuits producing a pulse output constituting one bit of the binary coded signals produced by the timing means associated therewith, the binary ripple counter included in the second timing means being composed of a lesser number of bistable logic circuits than the ripple counter included in the first timing means, so that the cyclic duration of said second group of coded signals is shorter than the cyclic duration of said first group of coded signals, said second timing means includes first logic means for resetting the bistable logic circuits forming the ripple counter associated therewith to one of their stable states representing the start of the cycle of the second group of coded signals whenever the same logic circuits are all in the other of their stable states representing the end of the cycle and whenever the said first-named particular coded signal is produced by said first timing means, said means for controlling the first timing means comprises second logic means for resetting the bistable logic circuits forming the ripple counter associated with that timing means to one of their stable states representing the start of the cycle of the first group of coded signals whenever the said second particular coded signal is produced by said first timing means, and said heart rate responsive means and said signal selection means comprise mechanically interconnected switch means for selecting said first and second particular coded signals from the output of the first timing means.

29. Apparatus for producing a simulated basic electrocardiogram signal having P, R and T wave portions, said apparatus comprising:

first timing means for cyclically generating a first group of sequentially occurring uniquely digitally coded signals at a cyclic repetition rate equal to desired heart rates, so that said signals are digitally coded to represent the succeeding time intervals of the desired cardiac cycle;

second timing means responsive to a particular digitally coded signal from said first group of signals for cyclically generating a second group of sequentially occurring uniquely digitally coded signals at a cyclic repetition rate equal to the cyclic repetition rate of said first group of signals but having a cycle which starts at the beginning of the time interval of the desired cardiac cycle represented by said particular digitally coded signal;

heart rate responsive means coupled to said first and second timing means for selecting said particular digitally coded signal, the selection of the particular digitally coded signal being such that the faster the heart rate the earlier in point of time of the desired cardiac cycle the cyclic generation of the second group of coded signals will begin, to thereby reflect the decrease in systolic interval resulting from an increase in heart rate;

means coupled to the output of said first timing means for generating analog signals corresponding to the P wave and R wave portions of the desired cardiac cycle in response to digitally coded signals from said first group of signals which represent the beginning of the time intervals of the desired cardiac cycle at which the simulated P and R waves begin;

means coupled to the output of said second timing means for generating an analog signal corresponding to the T wave portion of the desired cardiac cycle in response to digitally coded signals from said second group of signals which represent the beginning of the time interval of the desired cardiac cycle at which the simulated T wave begins; and signal combining means for combining the said P, R and T wave analog signals to produce a simulated basic electrocardiogram signal having the desired heart rate and the proper heart rate dependent time phase relationship between the T wave portion and the P and R wave portions.

30. Apparatus as claimed in claim 29, wherein said means for generating the analog signals corresponding to the said P, R and T wave portions of the simulated basic electrocardiogram signal comprise:

an integrator circuit operable to produce an analog signal at its output which is the integral with respect to time of an analog signal applied to its input;

first logic control means coupled to the outputs of said first and second timing means for applying discrete constant amplitude analog signals to the input of said integrator circuit in response to those digitally coded signals from said first and second groups of signals which control the production of the P and T wave portions of the basic electrocardiogram signal to cause said integrator circuit to produce P and T wave analog signals each having sloping leading and trailing edges joined by a substantially constant amplitude central portion; and second logic control means coupled to the output of said first timing means for applying discrete constant amplitude analog signals to the input of said integrator circuit in response to those digitally coded signals from said first group of signals which control the production of the R wave portion of the basic electrocardiogram signal to cause said integrator circuit to produce an R wave analog signal of triangular shape.

References Cited

UNITED STATES PATENTS

| | | | |
|---|---|---|---|
| 3,024,568 | 3/1962 | Barnett | 35—17 X |
| 3,267,934 | 8/1966 | Thornton | 128—2.06 |
| 3,338,234 | 8/1967 | Kleinerman et al. | 128—2.06 |

EUGENE R. CAPOZIO, *Primary Examiner.*

H. S. SKOGQUIST, *Assistant Examiner.*